(12) United States Patent
Ueda et al.

(10) Patent No.: US 9,241,247 B2
(45) Date of Patent: Jan. 19, 2016

(54) MOBILE COMMUNICATION SYSTEM, BASE STATION, GATEWAY APPARATUS, CORE NETWORK APPARATUS, AND COMMUNICATION METHOD

(75) Inventors: Yoshio Ueda, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 963 days.

(21) Appl. No.: 13/258,888

(22) PCT Filed: Mar. 1, 2010

(86) PCT No.: PCT/JP2010/053204
§ 371 (c)(1),
(2), (4) Date: Sep. 22, 2011

(87) PCT Pub. No.: WO2010/119728
PCT Pub. Date: Oct. 21, 2010

(65) Prior Publication Data
US 2012/0015620 A1    Jan. 19, 2012

(30) Foreign Application Priority Data
Apr. 17, 2009 (JP) ................................. 2009-101130

(51) Int. Cl.
*H04W 4/22* (2009.01)
*H04W 12/08* (2009.01)
*H04W 60/00* (2009.01)
H04W 76/00 (2009.01)
H04W 84/04 (2009.01)

(52) U.S. Cl.
CPC ................ *H04W 4/22* (2013.01); *H04W 12/08* (2013.01); *H04W 60/00* (2013.01); *H04W 76/007* (2013.01); *H04W 84/045* (2013.01)

(58) Field of Classification Search
CPC . H04W 84/045; H04W 72/087; H04W 24/10; H04W 4/22; H04W 8/22; H04W 72/0433; G06Q 30/0623
USPC ........... 455/404.1, 436; 370/357, 232; 379/37
See application file for complete search history.

(56) References Cited

U.S. PATENT DOCUMENTS

| 2004/0087315 A1* | 5/2004 | Dufva et al. ............... 455/456.1 |
| 2005/0101288 A1 | 5/2005 | Hulkkonen et al. |

(Continued)

FOREIGN PATENT DOCUMENTS

| CN | 101222750 A | 7/2008 |
| CN | 101466083 A | 6/2009 |

(Continued)

OTHER PUBLICATIONS

Russian Office Action for RU2011146642/07(069921) mailed on Jan. 16, 2013.

(Continued)

*Primary Examiner* — Phuoc H Doan

(57) ABSTRACT

A mobile communication system includes a mobile station, a base station that communicates wirelessly with the mobile station, a gateway apparatus that connects the base station to a core network, and a core network apparatus that is arranged in the core network. The base station includes a control unit that includes, in a message, information indicating that the mobile station has originated a call as an emergency call, and a transmission unit that transmits the message to the core network apparatus. In addition, the core network apparatus includes a reception unit that receives the message that was transmitted from the base station.

22 Claims, 23 Drawing Sheets

(56) References Cited

U.S. PATENT DOCUMENTS

| | | | |
|---|---|---|---|
| 2008/0076392 A1 | 3/2008 | Khetawat et al. | |
| 2009/0061877 A1* | 3/2009 | Gallagher et al. | 455/436 |
| 2012/0069737 A1* | 3/2012 | Vikberg et al. | 370/232 |

FOREIGN PATENT DOCUMENTS

| | | | |
|---|---|---|---|
| CN | 101500213 | A | 8/2009 |
| JP | 64-55927 | A | 3/1989 |
| JP | 64-55930 | A | 3/1989 |
| JP | 2003244284 | A | 8/2003 |
| JP | 2005-236703 | A | 9/2005 |
| JP | 2005-260746 | A | 9/2005 |
| JP | 2007-228375 | A | 9/2007 |
| JP | 2008-141490 | A | 6/2008 |
| JP | 2008263632 | A | 10/2008 |
| RU | 2326503 | C2 | 6/2008 |
| WO | 2007016695 | A2 | 2/2007 |
| WO | 2007096685 | A1 | 8/2007 |
| WO | 2009/013792 | A1 | 1/2009 |
| WO | 2009013792 | A | 1/2009 |

OTHER PUBLICATIONS

Japanese Office Action for JP Application No. 2011-509238 mailed on Jun. 25, 2013 with Partial English Translation.

Samsung et al., "UP Management", 3GPP TSG RAN WG Meeting #62, R3-083264, Nov. 10-14, 2008, [Internet] URL<http://www.3gpp.org/FTP/tsg_ran/WG3_Iu/TSGR3_62/docs/R3-083264.zip>. Cited in JP Office Action.

Japanese Office Action for JP Application No. 2013-188233 mailed on Jun. 10, 2014 with English Translation.

Chinese Office Action for CN Application No. 201080017080.1 issued on Nov. 7, 2013 with English Translation.

International Search Report for PCT/JP2010/053204 mailed May 18, 2010.

3GPP TS 25.467 V.8.1.0, 3rd Generation Partnership Project; Technical Specification Group Radio Access Network; UTRAN architecture for 3G Home NodeB; Stage 2 (Release 8), Mar. 2009, pp. 5-26.

3GPP TS 24.008 V.8.5.0, 3rd Generation Partnership Project; Technical Specification Group Core Network and Terminals; Mobile radio interface Layer 3 Specification; Core network protocols; Stage 3 (Release 8), Mar. 2009; pp. 277, 286-287.

Chinese Office Action for CN Application No. 201080017080.1 issued on Sep. 25, 2014 with English Translation.

3GPP TSG-RAN WG3 Meeting #59bis, 3G HNB Access Network Architecture Considerations, (Kineto Wireless Inc at al.), R3-080698, 04.2008. Cited in Decision on Grant Patent for Invention.

Decision on Grant Patent for Invention for RU Application No. 2013140444/07(061520) mailed on Sep. 4, 2015 with English Translation.

* cited by examiner

Fig.2

RRC CONNECTION REQUEST(TS25.331)

RRC Connection Request is the first message transmitted by the UE when setting up an RRC Connection to the network.

RLC-SAP: TM

Logical channel: CCCH

Direction: UE → UTRAN

| Information Element/Group name | Need | Multi | Type and reference | Semantics description | Version |
|---|---|---|---|---|---|
| Message Type | MP | | Message Type | | |
| Radio Bearer IEs | | | | | |
| Predefined configuration status information | MP | | Boolean | True indicates the UE has all pre- configurations stored with the same value tag as broadcast in the cell in which the RRC connection establishment is initiated. | REL-5 |
| UE information elements | | | | | |
| Initial UE identity | MP | | Initial UE identity 10.3.3.15 | | |
| Establishment cause | MP | | Establishment cause 10.3.3.11 | | |
| Protocol error indicator | MD | | Protocol error indicator 10.3.3.27 | Default value is FALSE | |
| >UE Specific Behaviour information 1 idle | OP | | UE Specific Behaviour information 1 idle 10.3.3.51 | This IE shall not be included in this version of the protocol | |
| . . . | | | | | |

Fig.3

INITIAL DIRECT TRANSFER(TS25.331)

This message is used to initiate a signalling connection based on indication from the upper layers, and to transfer a NAS message.
RLC-SAP: AM
Logical channel: DCCH
Direction: UE → UTRAN

| Information Element/Group name | Need | Multi | Type and reference | Semantics description | Version |
|---|---|---|---|---|---|
| Message Type | MP | | Message Type | | |
| UE information elements | | | | | |
| Integrity check info | CH | | Integrity check info 10.3.3.16 | | |
| PLMN identity | OP | | PLMN identity 10.3.1.11 | This IE indicates the PLMN to which the UE requests the signaling connection to be established. | REL-6 |
| CN information elements | | | | | |
| CN domain identity | MP | | CN domain identity 10.3.1.1 | | |
| Intra Domain NAS Node Selector | MP | | Intra Domain NAS Node Selector 10.3.1.8 | | |
| NAS message | MP | | NAS message 10.3.1.8 | | |
| START | OP | | START 10.3.3.38 | START value to be used in the CN domain as indicated in the IE "CN domain identity". This IE shall always be present in this version of the protocol. | |
| Establishment cause | OP | | Establishment cause 10.3.3.11 | | REL-5 |
| CS Call Type | CV-Conversational/CS | | Enumerated (speech, video, other) | One spare value is needed | REL-7 |
| Measurement Information elements | | | | | |
| Measured results on RACH | OP | | Measured results on RACH 10.3.7.45 | | |
| MBMS joined information | OP | | | | REL-6 |
| >P-TMSI | OP | | P-TMSI (GSM-MAP) 10.3.1.13 | | REL-6 |

Fig.4
Establishment cause(TS25.331)

Cause for an RRC connection establishment request.

| Information Element/Group name | Need | Multi | Type and reference | Semantics description |
|---|---|---|---|---|
| Establishment cause | MP | | Enumerated( Originating Conversational Call, Originating Streaming Call, Originating Interactive Call, Originating Background Call, Originating Subscribed traffic Call, Terminating Conversational Call, Terminating Streaming Call, Terminating Interactive Call, Terminating Background Call, Emergency Call, Inter-RAT cell re-selection, Inter-RAT cell change order, Registration, Detach, Originating High Priority Signalling, Originating Low Priority Signalling, Call re-establishment, Terminating High Priority Signalling, Terminating Low Priority Signalling, Terminating - cause unknown, MBMS reception, MBMS ptp RB request) | Eleven spare values are needed. |

Fig.5
UE REGISTER REQUEST

This message is sent by the HNB to the HNB-GW to register a UE at HNB-GW for service.

Direction: HNB → HNB-GW

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| UE Identity | M | | 9.2.17 | | YES | reject |
| Registration Cause | M | | 9.2.33 | | YES | ignore |
| UE Capabilities | M | | 9.2.34 | | YES | reject |

Fig.6
Registration Cause

Indicates if a UE registration is for an emergency call

| Information Element/Group name | Presence | Range | Type and reference | Semantics description |
|---|---|---|---|---|
| Registration cause | | | Enumerated ( emergency call, normal, ...) | |

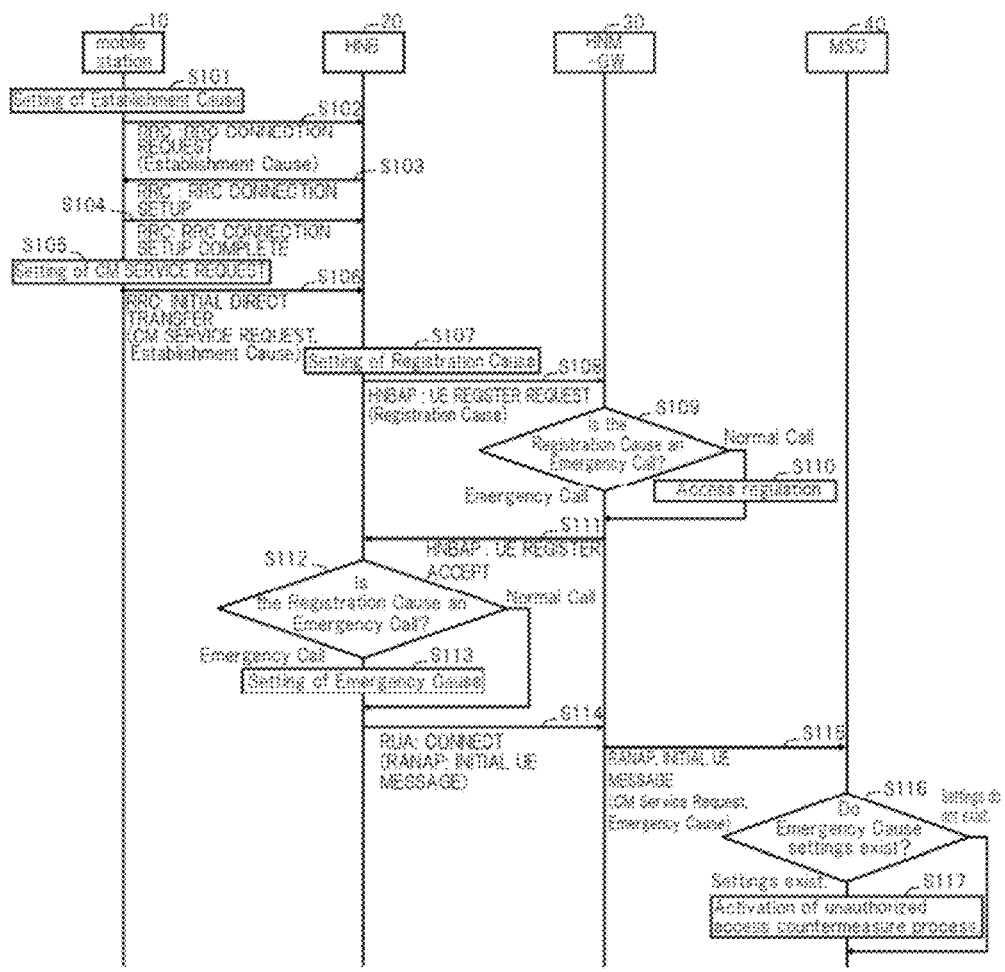

Fig.16

Table 9.2.11/3GPP TS 24.008: CM SERVICE REQUEST message content

| IEI | Information element | Type/Reference | Presence | Format | Length |
|---|---|---|---|---|---|
| | Mobility management protocol discriminator | Protocol discriminator 10.2 | M | V | ½ |
| | Skip indicator | Skip indicator 10.3.1 | M | V | ½ |
| | CM Service Request message type | Message type 10.4 | M | V | 1 |
| | CM service type | CM service type 10.5.3.3 | M | V | ½ |
| | Ciphering key sequence number | Ciphering key sequence number 10.5.1.2 | M | V | ½ |
| | Mobile station classmark | Mobile station classmark 2 10.5.1.6 | M | LV | 4 |
| | Mobile identity | Mobile identity 10.5.1.4 | M | LV | 2-9 |
| 8- | Priority | Priority Level 10.5.1.11 | O | TV | 1 |

Fig.17

Figure 10.5.77/3GPP TS 24.008 CM Service Type information element

Table 10.5.91/3GPP TS 24.008: CM Service Type information element

```
Service type (octet 1)
Bits
4 3 2 1
0 0 0 1  Mobile originating call establishment or packet mode connection
         establishment
0 0 1 0  Emergency call establishment
0 1 0 0  Short message service
1 0 0 0  Supplementary service activation
1 0 0 1  Voice group call establishment
1 0 1 0  Voice broadcast call establishment
1 0 1 1  Location Services   (NOTE)

All other values are reserved.
NOTE:    this service type shall only be used by a type A LMU if the MM
         connection was requested for the transmission of LCS signaling
         messages specified in 3GPP TS 44.071 [23a]
```

Fig.19

INITIAL UE MESSAGE

This message is sent by the RNC to transfer the radio interface initial layer 3 message to the CN.
Direction: RNC → CN.

Signalling bearer mode: Connection oriented.

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| CN Domain Indicator | M | | 9.2.1.5 | | YES | ignore |
| LAI | M | | 9.2.3.6 | | YES | ignore |
| RAC | C - ifPS | | 9.2.3.7 | | YES | ignore |
| SAI | M | | 9.2.3.9 | | YES | ignore |
| NAS-PDU | M | | 9.2.3.5 | | YES | ignore |
| Iu Signalling Connection Identifier | M | | 9.2.1.38 | | YES | ignore |
| Global RNC-ID | M | | 9.2.1.39 | If the Extended RNC-ID IE is included in the message, the RNC-ID IE in the Global RNC-ID IE shall be ignored. | YES | ignore |
| GERAN Classmark | O | | 9.2.1.57 | | YES | ignore |
| Selected PLMN Identity | O | | 9.2.3.33 | | YES | ignore |
| NAS Sequence Number | O | | 9.2.3.34 | | YES | ignore |
| Permanent NAS UE Identity | O | | 9.2.3.1 | | YES | ignore |
| Redirect Attempt Flag | O | | 9.2.3.50 | | YES | ignore |
| Extended RNC-ID | O | | 9.2.1.39a | The Extended RNC-ID IE shall be used if the RNC identity has a value larger than 4095. | YES | reject |
| CSG Id | O | | 9.2.1.85 | | YES | reject |
| | O | | | | YES | |

Fig.30

COMMON ID

This message is sent by the CN to inform the RNC about the permanent NAS UE identity for a user. It may include additional information.

Direction: CN → RNC.

Signalling bearer mode: Connection oriented.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Permanent NAS UE Identity | M | | 9.2.3.1 | | YES | ignore |
| SNA Access Information | O | | 9.2.3.24 | | YES | ignore |
| UESBI-Iu | O | | 9.2.1.56 | | YES | ignore |
| Selected PLMN Identity | O | | 9.2.3.33 | | YES | ignore |
| Subscriber Profile ID for RAT/Frequency priority | O | | 9.2.1.86 | | YES | ignore |
| Call type | O | | 9.2.1.xx | | YES | ignore |

Fig.31

| Case | Call Type | Registration Cause | Operation of HNB-GW |
|---|---|---|---|
| 1 | Normal Call | Normal Call | Implement normal processing |
| 2 | Normal Call | Emergency Call | Implement call release |
| 3 | Emergency Call | Normal Call | Implement normal processing |
| 4 | Emergency Call | Emergency Call | Implement normal processing |

Fig.34

DIRECT TRANSFER

This message is sent by both the CN and the RNC and is used for carrying NAS information over the Iu interface.

Direction: RNC → CN and CN → RNC.

Signalling bearer mode: Connection oriented.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| NAS-PDU | M | | 9.2.3.5 | | YES | ignore |
| LAI | O | | 9.2.3.6 | | YES | ignore |
| RAC | O | | 9.2.3.7 | | YES | ignore |
| SAI | O | | 9.2.3.9 | | YES | ignore |
| SAPI | O | | 9.2.3.8 | | YES | ignore |
| Redirection Indication | O | | 9.2.3.36 | | YES | ignore |
| Redirection Completed | O | | 9.2.3.35 | | YES | ignore |
| Subscriber Profile ID for RAT/Frequency priority | | | 9.2.1.86 | | YES | ignore |
| Call Type | O | | 9.2.1.XX | | YES | ignore |

Fig.36

RAB ASSIGNMENT REQUEST

This message is sent by the CN to request the establishment, modification or release of one or more RABs for the same UE.
Direction: CN→RNC.
Signalling bearer mode: Connection oriented

| IE/Group Name | Presence | Range | IE type and reference | Semantics description | Criticality | Assigned Criticality |
|---|---|---|---|---|---|---|
| Message Type | M | | 9.2.1.1 | | YES | reject |
| RABs To Be Setup Or Modified List | O | | | | YES | ignore |
| >RABs To Be Setup Or Modified Item IEs | | 1 to <maxnoofRABs> | | | | |
| >>First Setup Or Modify Item | M | | | Grouping reason: same criticality | EACH | reject |
| >>>RAB ID | M | | 9.2.1.2 | The same RAB ID must only be present in one group. | - | |
| >>>NAS Synchronisation Indicator | O | | 9.2.3.18 | | - | |
| >>>RAB Parameters | O | | 9.2.1.3 | Includes all necessary parameters for RABs (both for MSC and SGSN) including QoS. | - | |
| >>>User Plane Information | O | | | | | |
| >>>>User Plane Mode | M | | 9.2.1.18 | | - | |
| >>>>UP Mode Versions | M | | 9.2.1.19 | | - | |
| >>>Transport Layer Information | O | | | | | |
| >>>>Transport Layer Address | M | | 9.2.2.1 | | - | |
| >>>>Iu Transport Association | M | | 9.2.2.2 | | - | |
| >>>Service Handover | O | | 9.2.1.41 | | - | |
| >>Second Setup Or Modify Item | M | | | Grouping reason: same criticality | EACH | ignore |
| >>>PDP Type Information | O | | 9.2.1.40 | | - | |
| >>>Data Volume Reporting Indication | O | | 9.2.1.17 | | - | |
| >>>DL GTP-PDU Sequence Number | O | | 9.2.2.3 | | - | |
| >>>UL GTP-PDU Sequence Number | O | | 9.2.2.4 | | - | |
| >>>DL N-PDU Sequence Number | O | | 9.2.1.33 | | - | |
| >>>UL N-PDU Sequence Number | O | | 9.2.1.34 | | - | |
| >>>Alternative RAB Parameter Values | O | | 9.2.1.43 | | YES | ignore |
| >>>GERAN BSC Container | O | | 9.2.1.58 | | YES | ignore |
| >>> | O | | | | YES | |
| RABs To Be Released List | O | | | | YES | ignore |
| >RABs To Be Released Item IEs | | 1 to <maxnoofRABs> | | | EACH | ignore |
| >>RAB ID | M | | 9.2.1.2 | The same RAB ID must only be present in one group. | - | |
| >>Cause | M | | 9.2.1.4 | | | |

_US 9,241,247 B2_

MOBILE COMMUNICATION SYSTEM, BASE STATION, GATEWAY APPARATUS, CORE NETWORK APPARATUS, AND COMMUNICATION METHOD

TECHNICAL FIELD

The present invention relates to a mobile communication system, a base station, a gateway apparatus, a core network apparatus, and a communication method.

BACKGROUND ART

Forms of utilization of a femto base station (Home Node B, hereinbelow abbreviated as "HNB") in industry that can be considered include, for example, forms of utilization such as a compact wireless base station for residential use and a compact wireless base station in a business.

Offering a service by means of an HNB has the following advantages:
(1) Communication services can be offered in dead zones that are beyond the reach of radio waves of a macro base station.
(2) A charge service can be offered that is less expensive than normal charge services offered by macro base stations.
(3) Because high line quality (Ec/Io) can be obtained by a mobile station when the distance between the base station and the mobile station is small, high-speed technologies such as 64 QAM (64 Quadrature Amplitude Modulation) or MIMO (Multiple Input Multiple Output) can be utilized to enable the provision of high-speed packet service under the command of the HNB.
(4) A special content service can be offered that takes advantage of the locality of the HNB.

Because the services realized by an HNB have many advantages as stated above, services should be offered only to subscribers that have contracted with a communication common carrier or to subscribers that have permission from the owner of the HNB.

Accordingly, CSG (Closed Subscriber Group) was introduced in Release 8 in the 3GPP (3$^{rd}$ Generation Partnership Project) to limit access and reception of services of an HNB to only mobile stations of groups that have permission.

Details regarding CSG are next described with reference to FIG. 1.

The 3$^{rd}$ Generation mobile communication system shown in FIG. 1 includes: HNB 20, femto base station gateway (Home NodeB GW, hereinbelow abbreviated as "HNB-GW") 30, switching station (Mobile Switching Center, hereinbelow abbreviated as "MSC") 40, packet-switching station (Serving GPRS Support Node, hereinbelow abbreviated as "SGSN") 50, and 3$^{rd}$ generation-conforming mobile stations 10-2 and 10-2.

Of mobile stations 10-1 and 10-2 that are in range and under the command of HNB 20 in FIG. 1, mobile station 10-1 is an authorized mobile station. In contrast, mobile station 10-2 is a mobile station that attempts to receive service provided by HNB 20 without authorization and is hereinbelow referred to as unauthorized mobile station 10-2. In the following description, "mobile station 10" is used when either mobile station is specified.

HNB 20 is connected to a core network of an operator by way of HNB-GW 30.

The core network includes, as core network apparatuses, MSC 40 that controls circuit switching and SGSN 50 that controls packet switching.

When the CSG function is supported, HNB 20 reports the CSG identifier (CSG identity) of its own CSG cell to mobile station 10 that is in the range and under the command of HNB 20.

Mobile station 10-1 decodes the CSG identifier that was reported from HNB 20 and determines whether the CSG identifier is included in the CSG list held by mobile station 10-1.

If the CSG identifier is included in the CSG list, mobile station 10-1 is able to camp on the CSG cell within which it is in range and then receive various services such as originating calls or taking incoming calls.

On the other hand, if the CSG identifier is not included in the CSG list, mobile station 10-1 does not camp on the CSG cell within which it is in range and implements selection of a suitable CSG cell different from that CSG cell.

By means of this mechanism, HNB 20 can be accessed only by limited mobile stations 10-1 that have the CSG identifier of the CSG cell of that HNB 20.

However, a case can be considered in which an entity such as unauthorized mobile station 10-2 shown in FIG. 1 attempts to receive service without authorization in a CSG cell of HNB 20 for which access is not supposed to be available regardless of whether the CSG function is supported.

In such a case, MSC 40 or SGSN 50 checks the IMSI (International Mobile Subscriber Identity) of mobile station 10 and the CSG identifier of the CSG cell in which mobile terminal 10 is located to implement access regulation for regulating access to HNB 20 by mobile station 10 (3GPP TS25.467 Ver 8.0.0 Section 5.1.3).

On the other hand, because the CSG function is a function introduced by Release 8 of 3GPP, cases will occur in which mobile terminal 10-1 that predates Release 8 does not support the CSG function. Alternatively, cases will also occur in which HNB 20 does not support the CSG function.

In such cases, HNB 20 implements an Identification procedure (3GPP TS24.008 Ver 8.4.0) with respect to mobile station 10-1 in order to inquire regarding the IMSI of mobile terminal 10-1, or HNB 20 implements HNBAP (HNB Application Part): UE REGISTER REQUEST procedure (3GPP TS25.469 Ver 8.0.0) with respect to HNB-GW 30 to register mobile station 10-1 in HNB-GW 30. At this time, HNB-GW 30 carries out access regulation by checking whether the IMSI of mobile station 10-1 is able to access HNB 20.

If HNB-GW 30 determines that mobile station 10-1 is able to access HNB 20, HNB-GW 30 notifies HNB 20 that access is permitted by means of an HNBAP: UE REGISTER ACCEPT message. In this way, service realized by HNB 20 is provided to mobile station 10-1.

On the other hand, if mobile station 10 is unauthorized mobile station 10-2 shown in FIG. 1, the IMSI of unauthorized mobile station 10-2 is not registered to allow access to the CSG. As a result, HNB-GW 30 determines that unauthorized mobile station 10-2 cannot access HNB 20 and notifies HNB 20 by means of an HNBAP: UE REGISTER REJECT message that access is not permitted. In this way, the RRC (Radio Resource Control) connection between unauthorized mobile station 10-2 and HNB 20 is cut (3GPP TS25.467 Ver 8.0.0 Section 5.1.2).

As described hereinabove, when service is offered by means of HNB 20, MSC 40, SGSN 50, or HNB-GW 30 implements access regulation based on the IMSI of mobile station 10, whereby access to HNB 20 is rejected on the mobile communication network side during a signal establishment procedure even if unauthorized mobile station 10-2 that is not permitted to access HNB 20 should originate a call.

In the 3GPP standards, however, the ability to originate a call is prescribed when the call type is an emergency call even for mobile station 10 that is not permitted access to HNB 20 (3GPP TS22.011 Ver 8.6.0 Section 8.5.1).

When the call type is an emergency call, mobile station 10-1 sets "Emergency Call" in an Establishment Cause parameter that indicates the cause of the establishment request in the RRC: RRC CONNECTION REQUEST message or RRC: INITIAL DIRECT TRANSFER that is transmitted to HNB 20 at the time of requesting establishment of an RRC connection or at the time of requesting establishment of a signaling connection (3GPP TS25.331 Ver 8.5.0, Section 10.3.3.11, Patent Document 1).

HNB 20 then sets an "Emergency call" value in the Registration Cause parameter of an HNBAP: UE REGISTER REQUEST message that is transmitted to HNB-GW 30.

When the Registration Cause parameter is "Emergency call," HNB-GW 30 does not implement access regulation based on the IMSI (3GPP TS25.467 Ver 8.0.0 Section 5.1.2).

By means of this method, even mobile station 10 that is not permitted to access HNB 20 is able to skip the access regulation of HNB-GW 30 and access HNB 20 when the call type is an "Emergency Call."

The composition of the RRC: RRC CONNECTION REQUEST message is here shown in FIG. 2, the composition of the RRC: INITIAL DIRECT TRANSFER message is shown in FIG. 3, the composition of the Establishment Cause parameter in RRC protocol is shown in FIG. 4, the composition of the HNBAP: UE REGISTER REQUEST message is shown in FIG. 5, and the composition of the Registration Cause parameter in HBNAP protocol is shown in FIG. 6.

LITERATURE OF THE PRIOR ART

Patent Documents

Patent Document 1: JP-A-2003-244284

SUMMARY OF THE INVENTION

Problem to be Solved by the Invention

However, the above-described technique skips the access regulation of HNB-GW30 and permits access to HNB 20 by mobile station 10 when mobile station 10 originates a call as an emergency call.

As a result, mobile station 10 such as unauthorized mobile station 10-2 that is supposed to be unable to access HNB 20 may falsely set the Establishment Cause parameter to "Emergency call" in RRC protocol and thus evade the access regulation of HNB-GW 30 and gain access to HNB 20.

Unauthorized mobile station 10-2 of this type is believed to be easily buildable by modifying software such that only the Establishment Cause parameter is falsified.

Alternatively, there are cases in which an apparatus is interposed that decodes an RRC: RRC CONNECTION REQUEST message that has not been subjected to concealment or falsification countermeasures and that is transmitted on a common channel (RACH: Random Access Channel) from authorized mobile station 10-1, that replaces the Establishment Cause parameter with "Emergency call," encodes an RRC: RRC CONNECTION REQUEST message, and transmits to HNB 20. In such cases, even authorized mobile station 10-1 can be considered equivalent to the above-described unauthorized mobile station 10-2.

Unauthorized mobile station 10-2 of these types give rise to the following problems:

(1) HNB 20 that is installed for residential use or business use is used illegitimately by unauthorized mobile station 10-2.
(2) Unauthorized mobile station 10-2, by originating a call by way of HNB 20, is able to illegitimately receive a charge service that is less expensive than the normal charge service.
(3) Unauthorized mobile station 10-2 illegitimately receives a content service that is intended for specific users.

One method that has been considered for solving these problems involves the implementation of a call release process of mobile station 10 on the core network apparatus side when this mobile station 10 originates a call as an emergency call. For this purpose, the core network apparatus must sense that mobile station 10 has originated a call as an emergency call.

However, a core network apparatus in its current configuration is unable to detect that mobile station 10 has originated a call as an emergency call.

Alternatively, the implementation on the HNB-GW 30 side of a call release process of mobile station 10 that has falsely originated a call as an emergency call can also be considered. For this purpose, HNB-GW 30 must detect if the call type that was originated by mobile station 10 is actually an emergency call.

However, HNB-GW 30 in its current configuration is unable to detect the call type that is actually originated by mobile station 10.

It is therefore an object of the present invention to provide a mobile communication system, a base station, a gateway apparatus, a core network apparatus, and a communication method by which a core network apparatus is able to sense that a mobile station has originated a call as an emergency call.

It is another object of the present invention to provide a mobile communication system, a gateway apparatus, a core network apparatus, and a communication method by which a gateway apparatus is able to sense the call type that was actually originated by a mobile station.

Means for Solving the Problem

The first mobile communication system of the present invention is a mobile communication system that includes a mobile station, a base station that performs wireless communication with the mobile station, a gateway apparatus that connects the base station to a core network, and a core network apparatus that is arranged in the core network; wherein:
the base station includes:
a control unit that includes, in a message, information indicating that the mobile station has originated a call as an emergency call, and a transmission unit that transmits the message to the core network apparatus; and
the core network apparatus includes:
a reception unit that receives the message that was transmitted from the base station.

The second mobile communication system of the present invention is a mobile communication system that includes a mobile station, a base station that performs wireless communication with the mobile station, a gateway apparatus that connects the base station to a core network, and a core network apparatus that is arranged in the core network; wherein:
the gateway apparatus includes:
a control unit that includes, in a message, information indicating that the mobile station has originated a call as an emergency call, and a transmission unit that transmits the message to the core network apparatus; and the core network apparatus includes:
a reception unit that receives the message that was transmitted from the gateway apparatus.

The third mobile communication system of the present invention is a mobile communication system that includes a mobile station, a base station that performs wireless communication with the mobile station, a gateway apparatus that connects the base station to a core network, and a core network apparatus that is arranged in the core network; wherein:
the core network apparatus includes:
a control unit that includes, in a message, information indicating that the call type of a call originated by the mobile station is an emergency call; and
a transmission unit that transmits said message to the gateway apparatus; and
the gateway apparatus includes:
a reception unit that receives said message that was transmitted from the core network apparatus.

The base station of the present invention is a base station that is connected by way of a gateway apparatus to a core network apparatus that is arranged in a core network, and includes:
a control unit that includes, in a message, information indicating that a mobile station has originated a call as an emergency call; and
a transmission unit that transmits the message to the core network apparatus.

The first gateway apparatus of the present invention is a gateway apparatus that connects a base station to a core network apparatus that is arranged in a core network, and includes:
a control unit that includes, in a message, information indicating that a mobile station has originated a call as an emergency call; and
a transmission unit that transmits the message to the core network apparatus.

The second gateway apparatus of the present invention is a gateway apparatus that connects a base station to a core network apparatus that is arranged in a core network, and includes:
a reception unit that receives a message that is transmitted from the core network apparatus and contains information that indicates that the call type of a call originated by a mobile station is an emergency call.

The first core network apparatus of the present invention is a core network apparatus that is arranged in a core network and includes a reception unit that receives a message that is transmitted from a base station and that contains information that indicates that a mobile station has originated a call as an emergency call.

The second core network apparatus of the present invention is a core network apparatus that is arranged in a core network and includes a reception unit that receives a message that is transmitted from a gateway apparatus and that contains information that indicates that a mobile station has originated a call as an emergency call.

The third core network apparatus of the present invention is a core network apparatus that is arranged in a core network and includes:
a control unit that includes, in a message, information that indicates that the call type of a call originated by the mobile station is an emergency call; and
a transmission unit that transmits the message to the gateway apparatus.

The first communication method of the present invention is a communication method realized by a mobile communication system that includes a mobile station, a base station that performs wireless communication with the mobile station, a gateway apparatus that connects the base station to a core network, and a core network apparatus that is arranged in the core network, wherein the communication method includes steps of:
the base station including, in a message, information indicating that the Mobile station has originated a call as an emergency call;
the base station transmitting the message to the core network apparatus; and
the core network apparatus receiving the message that was transmitted from the base station.

The second communication method of the present invention is a communication method realized by a mobile communication system that includes a mobile station, a base station that performs wireless communication with the mobile station, a gateway apparatus that connects the base station to a core network, and a core network apparatus that is arranged in the core network, wherein the communication method includes steps of:
the gateway apparatus including, in a message, information indicating that the mobile station has originated a call as an emergency call;
the gateway apparatus transmitting the message to the core network apparatus; and
the core network apparatus receiving the message that was transmitted from the gateway apparatus.

The third communication method of the present invention is a communication method realized by a mobile communication system that includes a mobile station, a base station that performs wireless communication with the mobile station, a gateway apparatus that connects the base station to a core network, and a core network apparatus that is arranged in the core network, wherein the communication method includes steps of:
the core network apparatus including, in a message, information indicating that the call type of a call originated by the mobile station is an emergency call;
the core network apparatus transmitting the message to the gateway apparatus; and
the gateway apparatus receiving the message that was transmitted from the core network apparatus.

The fourth communication method of the present invention is a communication method realized by a base station that is connected by way of a gateway apparatus to a core network apparatus that is arranged in a core network, wherein the communication method includes steps of:
including, in a message, information indicating that a mobile station has originated a call as an emergency call; and
transmitting the message to the core network apparatus.

The fifth communication method of the present invention is a communication method realized by a gateway apparatus that connects a base station to a core network apparatus that is arranged in a core network, wherein the communication method includes steps of:
including, in a message, information that indicates that a mobile station has originated a call as an emergency call; and
transmitting the message to the core network apparatus.

The sixth communication method of the present invention is a communication method realized by a gateway apparatus that connects a base station to a core network apparatus that is arranged in a core network, wherein the communication method includes a step of: receiving a message that is transmitted from the core network apparatus and that contains information that indicates that the call type of a call originated by a mobile station is an emergency call.

The seventh communication method of the present invention is a communication method realized by a core network apparatus that is arranged in core network, wherein the communication method includes a step of receiving a message that is transmitted from a base station and that contains information indicating that a mobile station has originated a call as an emergency call.

The eighth communication method of the present invention is a communication method realized by a core network apparatus that is arranged in a core network, wherein the communication method includes a step of receiving a message that is transmitted from a gateway apparatus and that contains information indicating that a mobile station has originated a call as an emergency call.

The ninth communication method of the present invention is a communication method realized by a core network apparatus that is arranged in a core network, wherein the communication method includes steps of: including, in a message, information indicating that the call type of a call originated by a mobile station is an emergency call, and transmitting the message to a gateway apparatus.

Effect of the Invention

According to the first or second mobile communication system of the present invention, a base station or a gateway apparatus includes, in a message, information that indicates that a mobile station has originated a call as an emergency call and transmits the message to a core network apparatus.

Accordingly, the effect is obtained that the core network apparatus is able to sense that the mobile station has originated the call as an emergency call.

According to the third mobile communication system of the present invention, a core network apparatus includes, in a message, information indicating that the call type of a call originated by a mobile station is an emergency call and transmits the message to a gateway apparatus.

Accordingly, the effect is obtained that the gateway apparatus is able to sense that the call type of the call actually originated by the mobile station is an emergency call.

BRIEF DESCRIPTION OF THE DRAWINGS

FIG. 2 shows the configuration of an RRC CONNECTION REQUEST message.

FIG. 3 shows the configuration of an INITIAL DIRECT TRANSFER message.

FIG. 4 shows the configuration of an Establishment Cause parameter.

FIG. 5 shows the configuration of a UE REGISTER REQUEST message.

FIG. 6 shows the configuration of a Registration Cause parameter.

FIG. 15 is a sequence chart for describing the operation of the mobile communication system of the second exemplary embodiment of the present invention.

FIG. 16 shows the configuration of a CM SERVICE REQUEST message.

FIG. 17 shows the configuration of a CM Service Type parameter.

FIG. 19 shows the configuration of an INITIAL UE MESSAGE to which the Emergency Cause parameter according to the present invention is added.

FIG. 30 shows the configuration of a COMMON ID message according to the present invention.

FIG. 31 shows a table for determining according to the call type the processing in the HNB-GW of the fourth exemplary embodiment of the present invention.

FIG. 34 shows the configuration of a DIRECT TRANSFER message according to the present invention.

FIG. 36 shows the configuration of a RAB ASSIGNMENT REQUEST message according to the present invention.

BEST MODES FOR CARRYING OUT THE INVENTION

Best modes for implementing the present invention are next described with reference to the accompanying drawings.

In the exemplary embodiments described hereinbelow, the overall configuration of the mobile communication system is equivalent to that of the mobile communication system of FIG.

First Exemplary Embodiment

FIGS. 7 to 10 show the configurations of HNB 20, HNB-GW 30, MSC 40, and SGSN 50, respectively.

Figure 1:
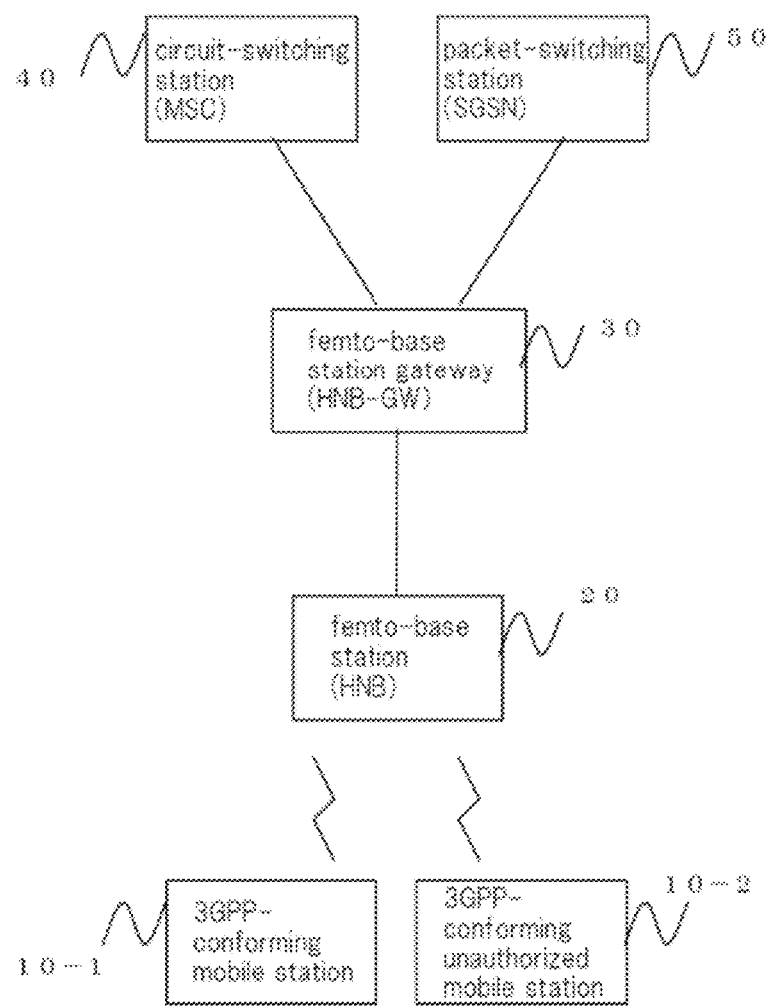
FIG. 1 shows the configuration of a 3$^{rd}$ Generation mobile communication system.
Figure 7:
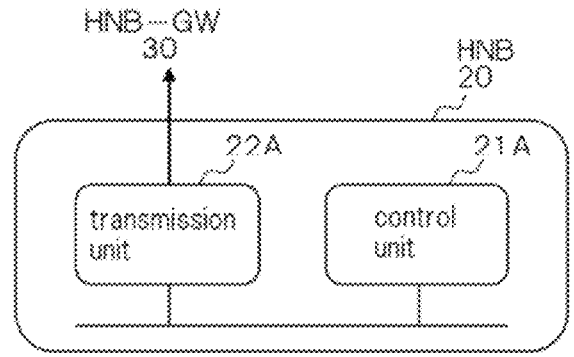
FIG. 7 is a block diagram showing the configuration of the HNB of the first exemplary embodiment of the present invention.

Referring to FIG. 7, HNB 20 of the present exemplary embodiment includes control unit 21A that includes information indicating that mobile station 10 has originated a call as an emergency call in a RANAP (Radio Access Network Application Part) protocol message, and transmission unit 22A that transmits the RANAP protocol message to HNB-GW 30. Further, RANAP protocol messages are messages of the application layer of a wireless access network, and for example, have functions for transparently transferring CC/MM signals that are transmitted and received between a UE and a core network apparatus within a RAN.

Figure 8:
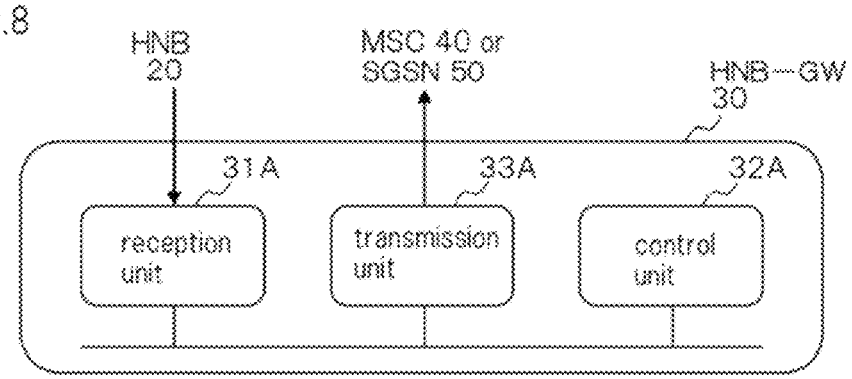
FIG. 8 is a block diagram showing the configuration of the HNB-GW of the first exemplary embodiment of the present invention.

Referring to FIG. 8, HNB-GW 30 of the present exemplary embodiment includes reception unit 31A that receives a RANAP protocol message from HNB 20, control unit 32A that extracts the RANAP protocol message, and transmission unit 33A that transmits the RANAP protocol message to MSC 40 or SGSN 50.

Figure 9:
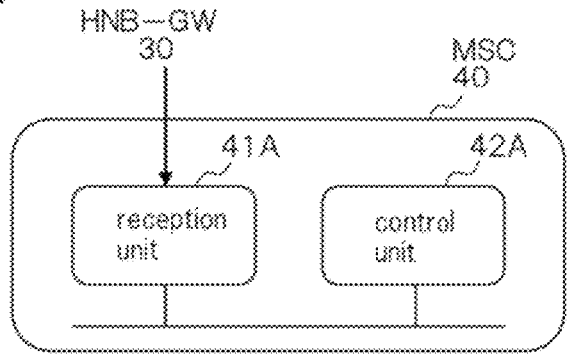
FIG. 9 is a block diagram showing the configuration of the MSC of the first exemplary embodiment of the present invention.

Referring to FIG. 9, MSC 40 of the present exemplary embodiment includes: reception unit 41A that receives the RANAP protocol message from HNB-GW 30; and control unit 42A that, when the RANAP protocol message contains information indicating that mobile station 10 has originated a call as an emergency call, distinguishes whether the call type of the call that was originated by mobile station 10 is actually an emergency call, and that carries out a call release process if the call is not an emergency call.

Figure 10:
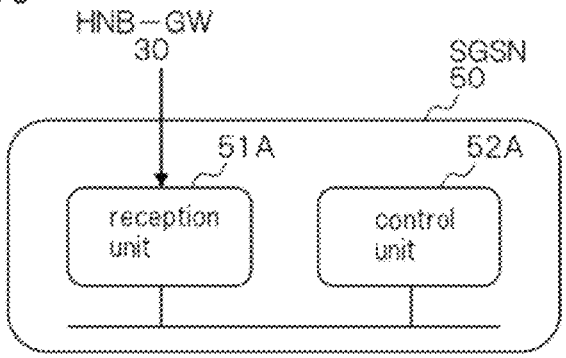
FIG. 10 is a block diagram showing the configuration of the SGSN of the first exemplary embodiment of the present invention.

In addition, referring to FIG. 10, SGSN 50 of the present exemplary embodiment includes: reception unit 51A that receives the RANAP protocol message from HNB-GW 30; and control unit 52A that, when the RANAP protocol message contains information indicating that mobile station 10 has originated a call as an emergency call, distinguishes whether the call type of the call originated by mobile station 10 is actually an emergency call, and that executes the call release process when the call is not an emergency call.

Accordingly, MSC 40 or SGSN 50 in the present exemplary embodiment is able to sense that mobile station 10 has originated a call as an emergency call.

As a result, when mobile station 10 has falsely altered the Establishment Cause to an emergency call, MSC 40 or SGSN 50 is able to implement the call release process of mobile station 10 and thus prevent the unauthorized reception of a service provided by HNB 20.

Second Exemplary Embodiment

FIGS. 11 to 14 show the configurations of HNB 20, HNB-GW 30, MSC 40, and SGSN 50, respectively, of the present exemplary embodiment. The present exemplary embodiment is an example in which the configurations and operations of HNB 20, HNB-GW 30, MSC 40, and SGSN 50 of the first exemplary embodiment of FIG. 7 to FIG. 10 are made more specific.

Figure 11:
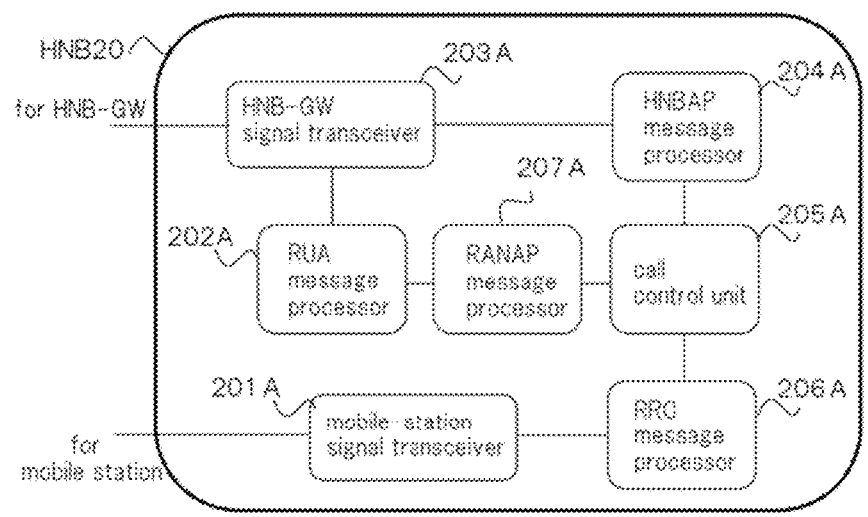
FIG. 11 is a block diagram showing the configuration of the BNB of the second exemplary embodiment of the present invention.

Referring to FIG. 11, HNB 20 of the present exemplary embodiment includes: mobile-station signal transceiver 201A, RUA (RANAP User Adaptation) message processor 202A, HNB-GW signal transceiver 203A, HNBAP message processor 204A, call control unit 205A, RRC message processor 206A, and RANAP message processor 207A.

In FIG. 11, control unit 21A shown in FIG. 7 is made up by RUA message processor 202A, HNBAP message processor 204A, call control unit 205A, RRC message processor 206A, and RANAP message processor 207A. In addition, HNB-GW signal transceiver 203A is one example of transmission unit 22A shown in FIG. 7.

As functions for transmitting and receiving RRC protocol messages to and from mobile station 10, mobile-station signal transceiver 201A includes, for example, a concealment function that conceals (encrypts and decrypts) messages, a signal delivery verification function that verifies the delivery of messages, and a signal distribution function that distributes messages.

As functions for transmitting and receiving HNBAP protocol messages and RUA protocol messages to and from HNB-GW 30, HNB-GW signal transceiver 203A includes functions such as the concealment function, the signal delivery verification function, and the signal distribution function.

RRC message processor 206A includes a function for encoding RRC protocol messages that are to be transmitted to mobile station 10 and a function for decoding RRC protocol messages that are received from mobile station 10.

HNBAP message processor 204A has a function for encoding HNBAP protocol messages that are to be transmitted to HNB-GW 30 and a function for decoding HNBAP protocol messages that are received from HNB-GW 30.

RANAP message processor 207A has a function for encoding RANAP messages that are to be transmitted to HNB-GW 30 and a function for decoding RANAP protocol messages that are received from HNB-GW 30.

RUA protocol is a protocol for performing the action of transmitting RANAP protocol messages, and RUA message processor 202A has a function for encoding RUA protocol messages that are to be transmitted to HNB-GW 30 and a function for decoding RUA protocol messages that are received from HNB-GW 30.

Based on the RRC protocol messages and RANAP protocol messages, call control unit 205A initiates various call processes such as establishing RRC connections, establishing bearers, and mobility management. Call control unit 205A further initiates HNBAP protocol and implements the process of registering mobile station 10 to HNB-GW 30. The above-described functions are functions that are typically held by a call processor that is installed in HNB 20.

As special functions of the present exemplary embodiment, call control unit 205A further includes a function for setting the Emergency Cause value of RANAP protocol messages transmitted to HNB-GW 30 based on the Registration Cause parameter of HNBAP protocol messages received from HNB-GW 30.

Figure 12:
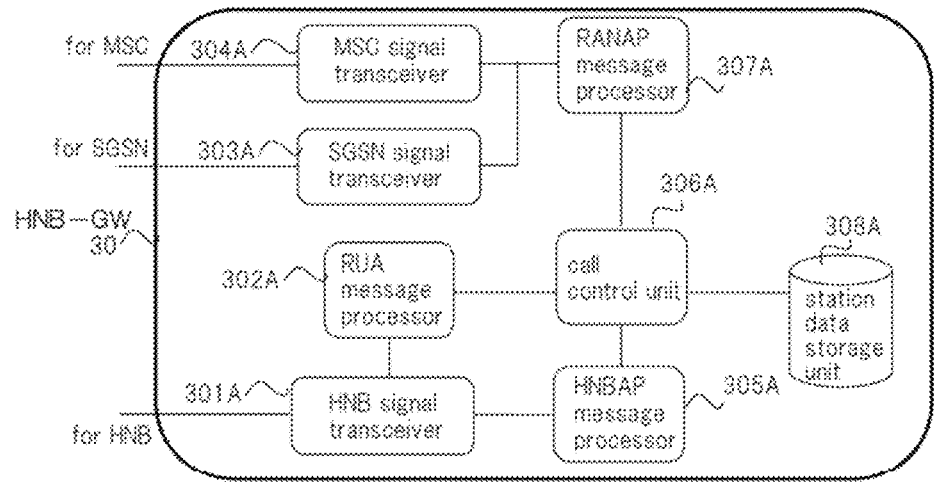
FIG. 12 is a block diagram showing the configuration of the HNB-GW of the second exemplary embodiment of the present invention.

Referring to FIG. 12, HNB-GW 30 of the present exemplary embodiment includes: HNB signal transceiver 301A, RUA message processor 302A, SGSN signal transceiver 303A, MSC signal transceiver 304A, HNBAP message processor 305A, call control unit 306A, RANAP message processor 307A, and station data storage unit 308A.

In FIG. 12, moreover, control unit 32A shown in FIG. 8 is made up by RUA message processor 302A, HNBAP message processor 305A, call control unit 306A, RANAP message processor 307A, and station data storage unit 308A. HNB signal transceiver 301A is one example of reception unit 31A shown in FIG. 8, and SGSN signal transceiver 303A and MSC signal transceiver 304A are examples of transmission unit 33A shown in FIG. 8.

HNB signal transceiver 301A is provided with a concealment function and a signal delivery verification function as functions for transmitting and receiving RUA protocol messages and HNBAP protocol messages to and from HNB 20.

MSC signal transceiver 304A is provided with, for example, an order control function for controlling the order of messages and a delivery verification function as functions for transmitting and receiving RANAP protocol messages to and from MSC 40.

SGSN signal transceiver 303A is provided with, for example, a delivery verification function and an order control function as functions for transmitting and receiving RANAP protocol messages to and from SGSN 50.

HNBAP message processor 305A is provided with a function for encoding HNBAP protocol messages that are to be transmitted to HNB 20 and a function for decoding HNBAP protocol messages that are received from HNB.

RUA message processor 302A is provided with a function for encoding RUA protocol messages that are to be transmitted to HNB 20 and a function for decoding RUA protocol messages that are received from HNB 20.

RANAP message processor 307A is provided with a function for encoding RANAP protocol messages that are to be transmitted to MSC 40 and a function for decoding RANAP protocol messages that are received from MSC 40.

Call control unit 306A carries out a process of registering HNB 103 and a process of registering mobile station 10. In addition, call control unit 306A is able to access station data that are stored in station data storage unit 308A. A list of IMSI that can be accessed is set for each CSG in the station data. Based on this IMSI list, HNB-GW 30 implements the regulation of access to HNB 20. The above-described functions are functions that are typically held by a call processor that is installed in HNB-GW 30.

Figure 13:
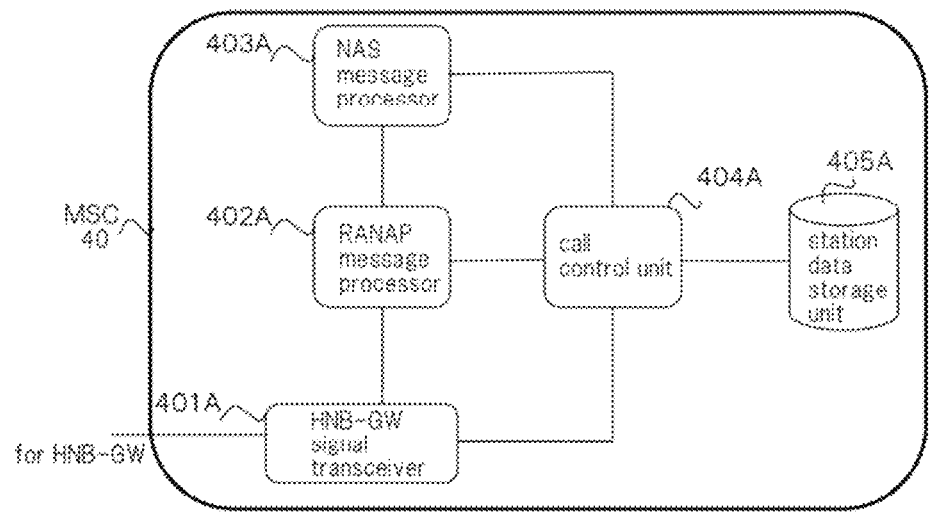
FIG. 13 is a block diagram showing the configuration of the MSC of the second exemplary embodiment of the present invention.

Referring to FIG. 13, MSC 40 of the present exemplary embodiment includes: HNB-GW signal transceiver 401A, RANAP message processor 402A, NAS (Non-Access Stratum) message processor 403A, call control unit 404A, and station data storage unit 405A.

In FIG. 13, control unit 42A shown in FIG. 9 is made up by RANAP message processor 402A, NAS message processor 403A, call control unit 404A, and station data storage unit 405A. HNB-GW signal transceiver 401A is one example of reception unit 41A shown in FIG. 9.

HNB-GW signal transceiver 401A is provided with, for example, a delivery verification function and an order control function as functions for transmitting and receiving RANAP protocol messages to and from HNB-GW 30.

RANAP message processor 402A is provided with a function for encoding RANAP messages that are to be transmitted to HNB-GW 30 and a function for decoding RANAP protocol messages that are received from HNB-GW 30.

NAS message processor 403A has function for transmitting and receiving messages of NAS protocol (CC (Call Control) protocol and MM (Mobility Management) protocol) to and from mobile station 10.

Call control unit 404A has call processing functions for carrying out call processing such as call establishment and call release, mobility management functions for carrying out mobility management such as position registration and handover, and moreover, access regulation functions for regulating access to HNB 20. Call control unit 404A can access the station data that are stored in station data storage unit 405A. A list of IMSI that can be accessed for each CSG is set in the station data. Based on this IMSI list, MSC 40 implements the regulation of access to HNB 20. The above-described functions are functions typically held by the call processor that is installed in MSC 40.

In addition, as a special function of the present exemplary embodiment, call control unit 404A is provided with a function for analyzing NAS messages to distinguish whether the call type of a call that is originated by mobile station 10 is an emergency call when the Emergency Cause parameter is set in a RANAP protocol message that is received from HNB-GW 30. If the call type is not an emergency call, call control unit 404A implements the call release process.

Figure 14:
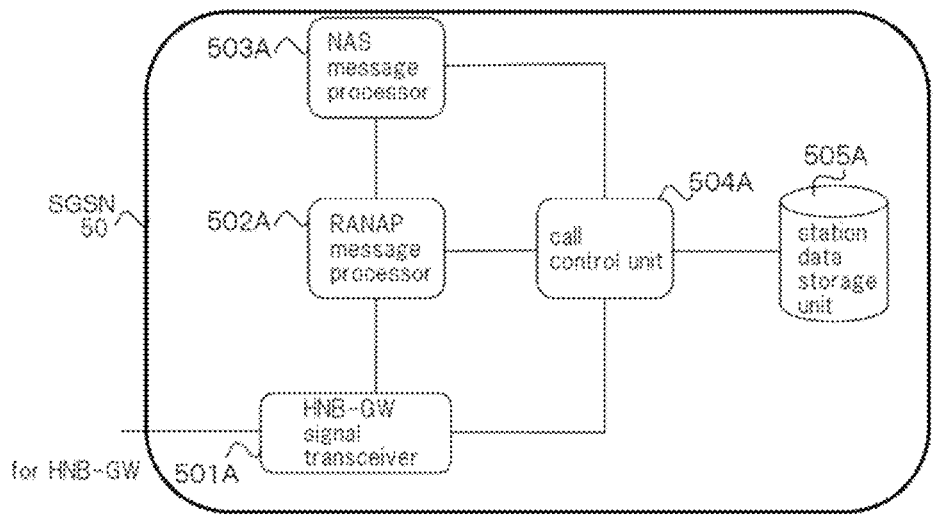
FIG. 14 is a block diagram showing the configuration of the SGSN of the second exemplary embodiment of the present invention.

Referring to FIG. 14, SGSN 50 of the present exemplary embodiment is provided with HNB-GW signal transceiver 501A, RANAP message processor 502A, NAS message processor 503A, call control unit 504A, and station data storage unit 505A.

In FIG. 14, control unit 52A shown in FIG. 10 is made up by RANAP message processor 502A, NAS message processor 503A, call control unit 504A, and station data storage unit 505A. HNB-GW signal transceiver 501A is one example of reception unit 51A shown in FIG. 10.

HNB-GW signal transceiver 501A is provided with, for example, a delivery verification function and an order control function as functions for transmitting and receiving RANAP protocol messages to and from HNB-GW 30.

RANAP message processor 502A is provided with a function for encoding RANAP messages that are to be transmitted to HNB-GW 30 and a function for decoding RANAP protocol messages that are received from HNB-GW 30.

NAS message processor 503A is provided with a function for transmitting and receiving messages of NAS protocol (CC protocol and MM protocol) to and from mobile station 10.

Call control unit 504A has call processing functions, mobility management functions, and further, access regulation functions. Call control unit 504A is able to access station data that are stored in station data storage unit 505A. A list of IMSI that can be accessed is set for each CSG in the station data. Based on this IMSI list, SGSN 50 implements access regulation to HNB 20. The above-described functions are functions typically held by a call processor that is installed in SGSN 50.

Apart from these, as a special function of the present exemplary embodiment, call control unit 504A is further provided with a function of analyzing NAS messages to distinguish whether the call type of a call originated by mobile station 10 is an emergency call when the Emergency Cause parameter is set in a RANAP protocol message that is received from HNB-GW 30. If the call type is not an emergency call, call control unit 504A implements the call release process.

The operations of the mobile communication system of the present exemplary embodiments are next described.

(A) Cases of Circuit-Switched Calls:

An example of the operations when mobile station 10 has originated a call as a circuit-switched emergency call is first described with the sequence chart of FIG. 15.

Referring to FIG. 15, mobile station 10 sets the Establishment Cause (FIG. 4) in an RRC: RRC CONNECTION REQUEST message (FIG. 2) in Step S101, and in Step S102, transmits the RRC: RRC CONNECTION REQUEST message to HNB 20.

After securing a wireless resource, HNB 20 notifies mobile station 10 of the wireless resource in an RRC: RRC CONNECTION SETUP message in Step S103.

Mobile station 10, having established an RRC connection, notifies HNB 20 of the establishment in an RRC: RRC CONNECTION SETUP COMPLETE message in Step S104.

In Step S105, mobile station 10 next sets the CM Service Type parameter (FIG. 17) of the CM SERVICE REQUEST message (FIG. 16), which is an MM protocol message, to "Emergency call establishment" and includes this CM SERVICE REQUEST message in an RRC: INITIAL DIRECT TRANSFER message (FIG. 3).

In Step S106, mobile station 10 further sets the Establishment Cause (FIG. 4) in this RRC: INITIAL DIRECT TRANSFER message to "Emergency call" and transmits this RRC: INITIAL DIRECT TRANSFER message (FIG. 3) to HNB 20.

In HNB 20, RRC protocol message processor 707A decodes the RRC: RRC CONNECTION REQUEST message that was transmitted in Step S102 and the RRC: INITIAL DIRECT TRANSFER message that was transmitted in in Step S106.

In HNB 20, call control unit 205A saves the Establishment Cause value (FIG. 4) that was reported in the RRC: RRC CONNECTION REQUEST message and the RRC: INITIAL DIRECT TRANSFER message from mobile station 10 and then, in Step S107, determines the Registration Cause parameter based on the Establishment Cause value and sets the parameter to an HNBAP: UE REGISTER REQUEST message (FIG. 5).

Figure 18:
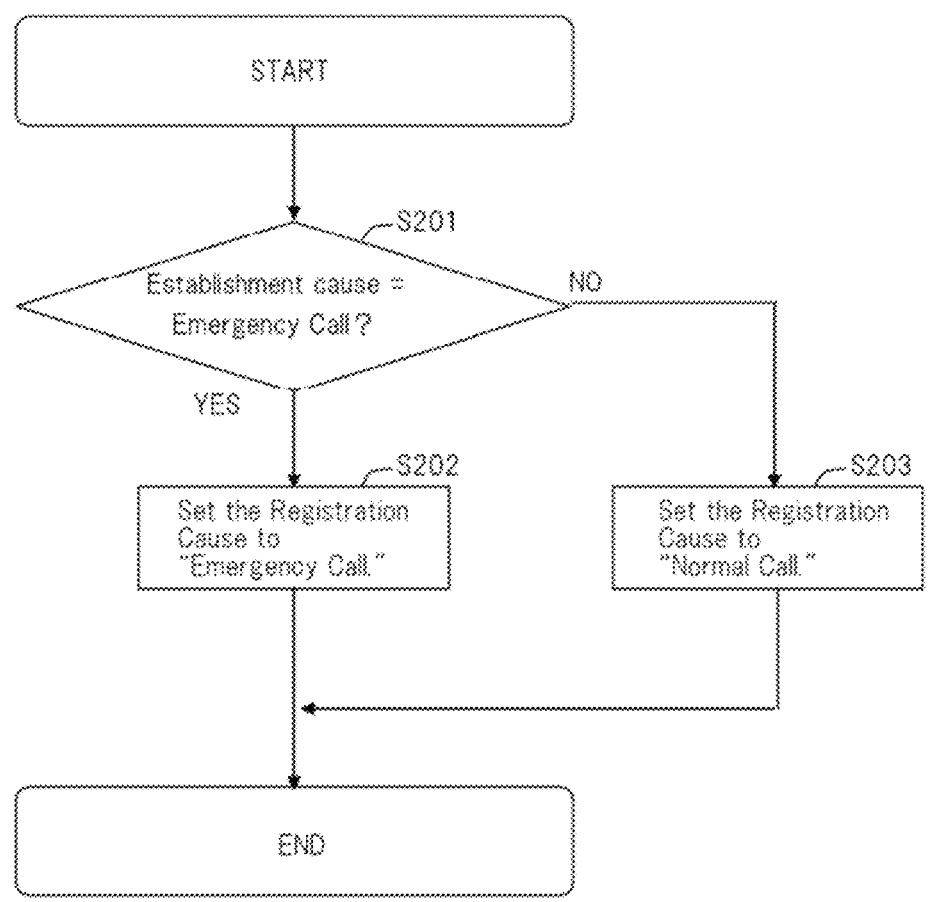
FIG. 18 is a flow chart showing the process of determining the Registration Cause by the HNB.

FIG. 18 shows a flow chart of the process of determining the Registration Cause parameter.

Referring to FIG. 18, call control unit 205A determines in Step S201 whether the Establishment Cause value is "Emergency Call," and if the Establishment Cause value is "Emergency Call," determines the Registration Cause parameter to be "Emergency Call" in Step S202, and if the Establishment Cause value is not "Emergency Call," determines the Registration Cause parameter to be "Normal Call" in Step S203.

Again referring to FIG. 15, HNB 20 transmits an HNBAP: UE REGISTER REQUEST message (FIG. 5) in which the Registration Cause parameter is set to HNB-GW 30 in Step S108.

In HNB-GW 30, HNB signal transceiver 301A receives the HNBAP: UE REGISTER REQUEST message, HNBAP message processor 305A decodes the HNBAP: UE REGISTER REQUEST message, and in Step S109, call control unit 306A judges whether to implement access regulation (Step S110) based on the Registration Cause parameter that is set in the HNBAP: UE REGISTER REQUEST message.

In HNB-GW 30, if the Registration Cause parameter is "Emergency Call," access regulation is not implemented. In this case, call control unit 306A assigns a context ID to the relevant mobile station 10, HNBAP message processor 305A encodes an HNBAP: UE REGISTER ACCEPT message, and in Step S111, HNB signal transceiver 301A transmits the HNBAP: UE REGISTER ACCEPT message to HNB 20.

In HNB 20, after receiving the HNBAP: UE REGISTER ACCEPT message, call control unit 205A determines that the Registration Cause parameter is "Emergency Call" in Step S112, and if the Registration Cause parameter is "Emergency Call," call control unit 205A generates an Emergency Cause parameter (FIG. 19) that is introduced by the present invention in Step S113. RANAP message processor 207A encodes an RANAP: INITIAL UE MESSAGE message that contains the Emergency Cause parameter. RANAP message processor 207A further sets the NAS-PDU (Protocol Data Unit) parameter in the RANAP: INITIAL UE MESSAGE message and sets the CM SERVICE REQUEST message of MM protocol that was received from mobile station 10 in the NAS-PDU parameter. RUA message processor 703A generates an RUA: CONNECT message that contains the RANAP: INITIAL UE MESSAGE message. In other words, the RANAP: INITIAL UE MESSAGE message is transferred from HNB 20 to HNB-GW 30 by an RUA: CONNECT message in Step S114.

In HNB-GW 30, RUA message processor 302A decodes the CONNECT message of RUA protocol, call control unit 306A extracts the RANAP: INITIAL UE MESSAGE message that was already encoded in HNB 20, and in Step S115, RANAP message processor 307A transmits the RANAP: INITIAL UE MESSAGE message to MSC 40 based on routing information such as the CN Domain ID.

In MSC 40, RANAP message processor 402A decodes the RANAP: INITIAL UE MESSAGE message, and further, NAS message processor 403A decodes the CM SERVICE REQUEST message that is set in NAS-PDU. The result of this decoding is reported to call control unit 404A. Call control unit 404A determines whether or not the Emergency Cause parameter that is introduced by the present invention is set in Step S116, and if the Emergency Cause parameter is set, activates the unauthorized access countermeasure process for CS (Circuit Switching) service in Step S117.

Figure 20:
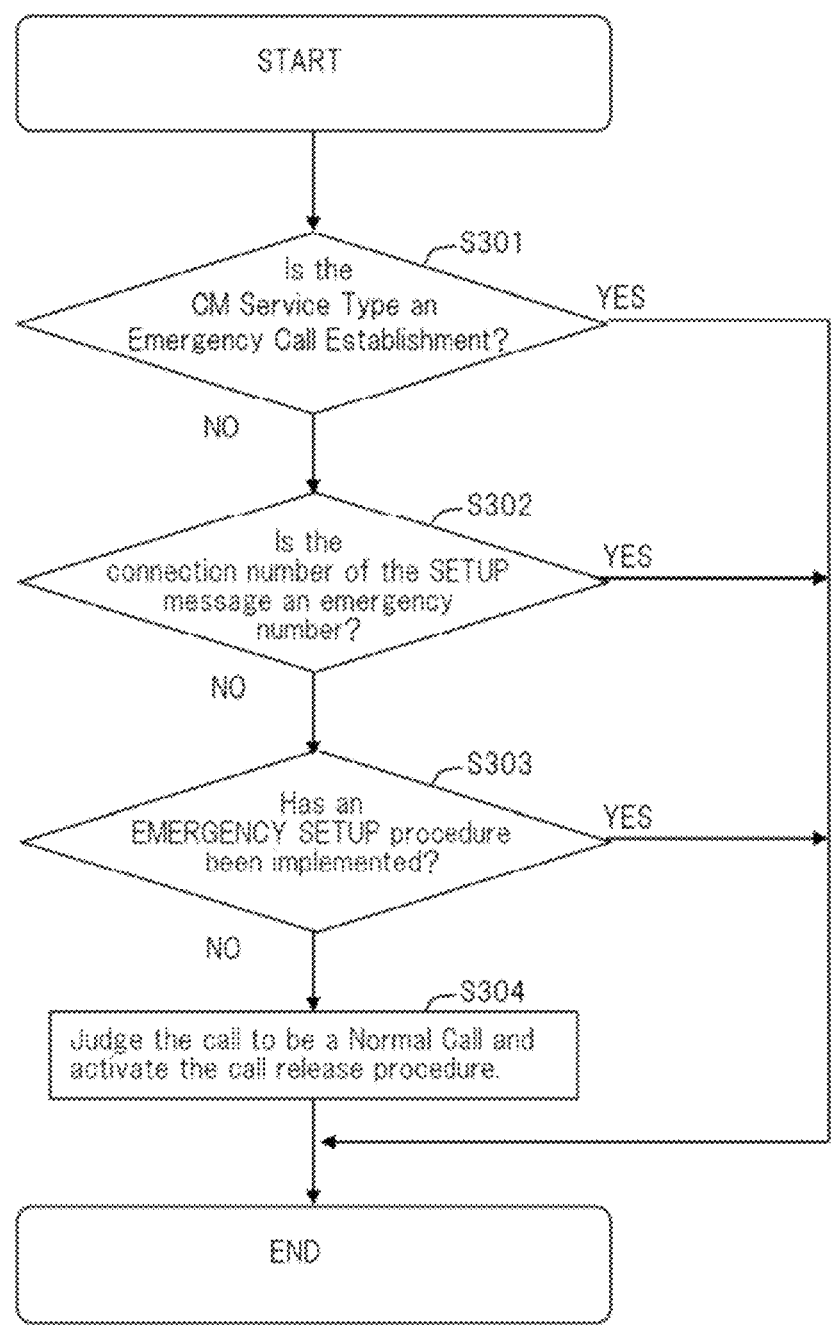
FIG. 20 is a flow chart showing the unauthorized access countermeasure process realized by the MSC of the second exemplary embodiment of the present invention.

FIG. 20 shows a flow chart of the unauthorized access countermeasure process for CS service.

Referring to FIG. 20, call control unit 404A checks whether the CM Service Type parameter (TS24.008 Ver 8.5.0 section 10.5.3.3) that is set in the CM SERVICE REQUEST message (TS24.008 Ver 8.5.0 Section 9.2.9) of MM protocol that was transmitted from mobile station 10 is "Emergency Call Establishment" in Step S301.

Call control unit 404A next checks whether the telephone number (TS24.008 Ver 8.5.0 Section 10.5.4.7) of the SETUP (TS24.008 Ver 8.5.0 Section 9.3.23 Setup) message of CC protocol that is a call origination signal transmitted by MSC 40 is an emergency number in Step S302. More specifically, Number digit 1, Number digit 2, Number digit 3, and so on in FIG. 10.5.91 of TS24.008 Ver 8.5.0/3GPP TS24.008 Called party BCD number information element are relevant to a telephone number and call control unit 404A checks whether this telephone number is an emergency number. The Called Party BCD Number of Section 10.5.4.7 of TS24.008 refers to the connection number, and BCD (Binary-coded decimal) indicates that one digit in a decimal expression is expressed by a 4-digit binary number that expresses from 0 to 9 and is one method of expressing numbers in computers.

In Step S303, call control unit 404A next checks whether or not an EMERGENCY SETUP procedure (TS24.008 Ver 8.5.0 Section 9.3.8) is being carried out in mobile station 10. For example, upon receiving a message from mobile station 10 for initiating "emergency call establishment," call control unit 404A checks based on the information element "Emergency setup message type" whether the EMERGENCY SETUP procedure is being carried out.

If any of the checks of Steps S301-S303 is satisfied, call control unit 404A determines that the call type is an emergency call, and continues call processing for an emergency call. On the other hand, if any of the checks is not satisfied, call control unit 404A determines that the call type is a normal call, views mobile station 10 as unauthorized mobile station 10-2, and initiates the call release process in Step S304.

In this way, it is possible to prevent unauthorized mobile station 10-2, which is not supposed to be able to access HNB 20 and which has altered the Establishment Cause to falsely represent an emergency call, from receiving service realized by HNB 20.

(B) The Case of a Packet-Switched Call:

An example of the operations when mobile station 10 originates a call as a packet-switched emergency call is next described.

The operation sequence in the case of a packet-switched call is similar to the operation for a circuit-switched call with the exception that the process that was carried out by MSC 40 in the case of a circuit-switched call is carried out by SGSN 50. However, in the case of a packet-switched call, an SM (Session Management) protocol message and GMM (GPRS Mobility Management) protocol message are applied as the NAS message. As a result, the unauthorized access countermeasure process that is initiated in Step S117 is an unauthorized access countermeasure for a PS (Packet-Switching) service. The identification method of the emergency call in this process differs from that of a CS service. In addition, when speech is used in packet switching, a VoIP (Voice over IP) method is used. GMM is a protocol for mobility management in a (PS) packet service.

Figure 21:
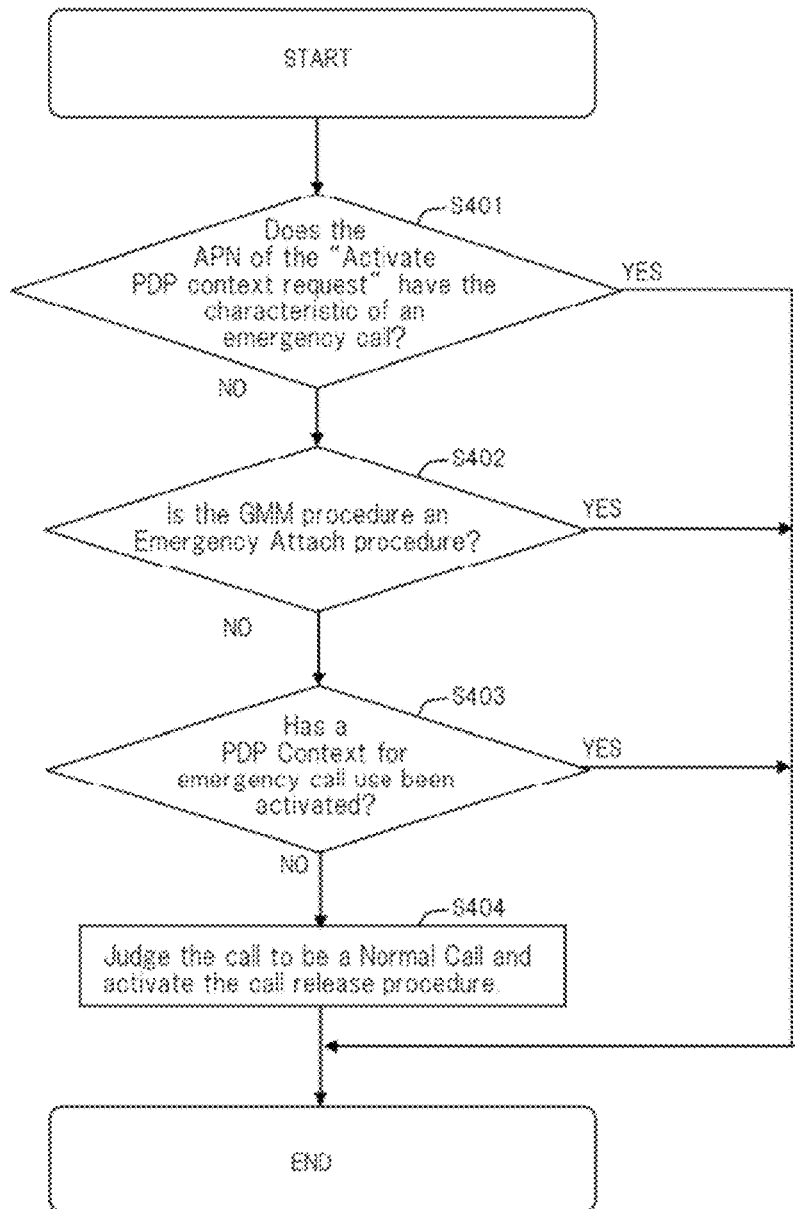
FIG. 21 is a flow chart showing the unauthorized access countermeasure process realized by the SGSN of the second exemplary embodiment of the present invention.

FIG. 21 shows a flow chart of the unauthorized access countermeasure process for a PS service.

Referring to FIG. 21, call control unit 504A of SGSN 50 checks in Step S401 whether the APN (Access Point Name) (3GPP TS24.008 Ver 9.5.1 Section 10.5.6.1) that is set in the Activate PDP (Packet Data Protocol) context request message (3GPP TS24.008 Ver 8.5.0 Section 9.5.1) of SM protocol that was transmitted from mobile station 10 is characteristic of an emergency call.

Call control unit 504A next checks in Step S402 whether the GMM procedure that is carried out in mobile station 10 is an Emergency Attach procedure (TR23.869 Ver 9.0.0).

Call control unit 504A next checks in Step S403 whether the PDP Context that is activated in SGSN 50 is the PDP Context for an emergency call. For example, call control unit 504A checks whether the PDP Context activated in SGSN 50 is the Emergency PDP Context of TR23.869 Ver 9.0.0.

If any of Steps S401-S403 is satisfied, call control unit 504A determines that the call type is an emergency call and continues the call processing for an emergency call. On the other hand, if any of the checks is not satisfied, call control unit 504A determines that the call type is a normal call, views mobile station 10 as unauthorized mobile station 10-2, and activates the call release process in Step S504.

It is thus possible to prevent unauthorized mobile station 10-2, which is not supposed to be able to access HNB 20, from altering the Establishment Cause to falsely represent an emergency call and from receiving service realized by HNB 20, even in the case of packet-switched VoIP.

Third Exemplary Embodiment

Figure 22:
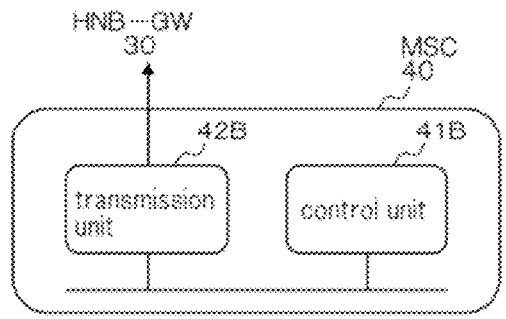
FIG. 22 is a block diagram showing the configuration of the MSC of the third exemplary embodiment of the present invention.
Figure 23:
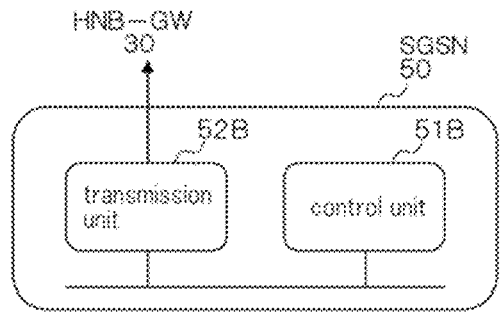
FIG. 23 is a block diagram showing the configuration of the SGSN of the third exemplary embodiment of the present invention.
Figure 24:
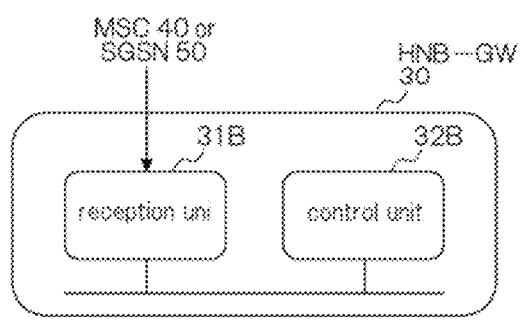
FIG. 24 is a block diagram showing the configuration of the HNB-GW of the third exemplary embodiment of the present invention.

FIGS. 22 to 24 show the configurations of MSC 40, SGSN 50, and HNB-GW 30, respectively, of the present exemplary embodiment.

Referring to FIG. 22, MSC 40 of the present exemplary embodiment includes control unit 41B that judges whether the call type of a call that is actually originated by mobile station 10 is an emergency call and includes information that indicates whether the call type is an emergency call in a RANAP protocol message, and transmission unit 42B that transmits the RANAP protocol message to HNB-GW 30.

Referring to FIG. 23, SGSN 50 of the present exemplary embodiment includes control unit 51B that judges whether the call type of a call that is actually originated by mobile station 10 is an emergency call, and that includes information indicating that the call type is an emergency call in a RANAP protocol message, and transmission unit 52B that transmits the RANAP protocol message to HNB-GW 30.

In addition, referring to FIG. 24, HNB-GW 30 of the present exemplary embodiment includes reception unit 31B that receives the RANAP protocol message from MSC 40 or SGSN 50, and when information indicating that the call type is an emergency call is contained in the RANAP protocol message, implements the call release process.

Accordingly, in, the present exemplary embodiment, HNB-GW 30 is able to sense that the call type of a call actually originated by mobile station 10 is an emergency call.

As a result, when mobile station 10 alters the Establishment Cause to falsely represent an emergency call, HNB-GW 30 is able to implement a call release process of mobile station 10 and thus prevent mobile station 10 from improperly receiving service realized by HNB 20.

Fourth Exemplary Embodiment

Figure 25:
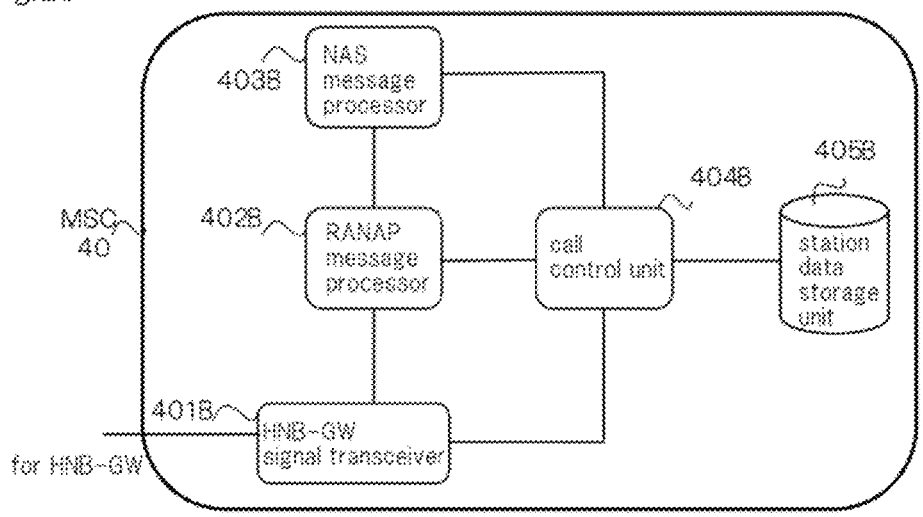
FIG. 25 is a block diagram showing the configuration of the MSC of the fourth exemplary embodiment of the present invention.
Figure 26:
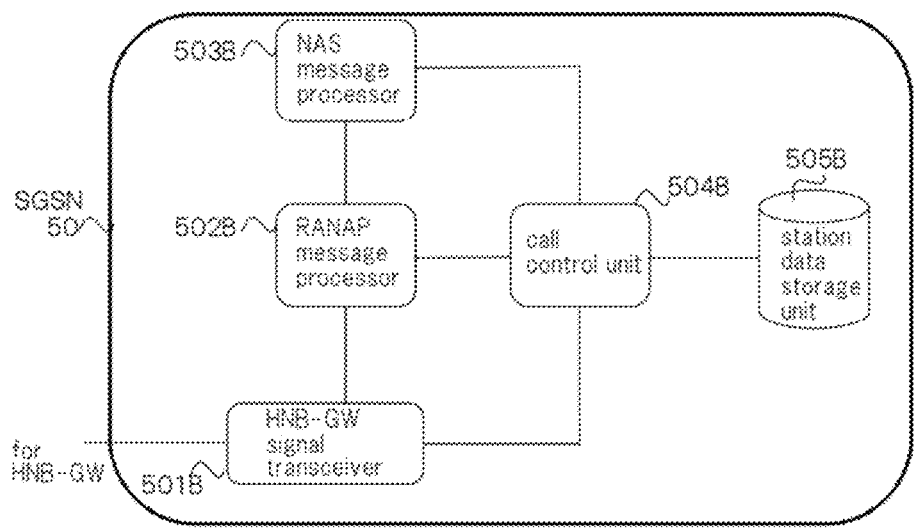
FIG. 26 is a block diagram showing the configuration of the SGSN of the fourth exemplary embodiment of the present invention.
Figure 27:
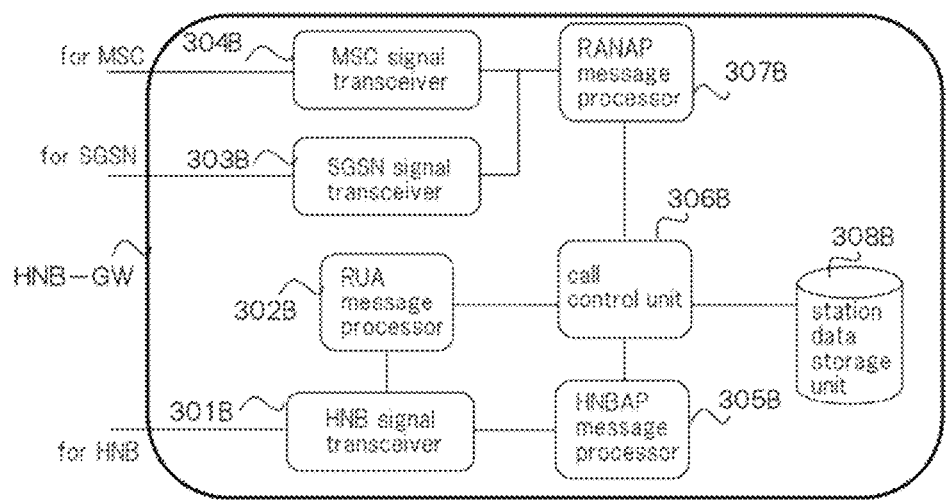
FIG. 27 is a block diagram showing the configuration of the HNB-GW of the fourth exemplary embodiment of the present invention.

FIG. 25 to FIG. 27 show the configurations of MSC 40, SGSN 50, and HNB-GW 30, respectively, of the present exemplary embodiment. The present exemplary embodiment is an example in which the configurations and operations of MSC 40, SGSN 50, and HNB-GW 30 of the third exemplary embodiment of FIGS. 22-24 are described in greater specificity.

Referring to FIG. 25, MSC 40 of the present exemplary embodiment includes HNB-GW signal transceiver 401B, RANAP message processor 402B, NAS message processor 403B, call control unit 404B, and station data storage unit 405B.

In FIG. 25, control unit 41B shown in FIG. 22 is made up by RANAP message processor 4028, NAS message processor 403B, call control unit 404B, and station data storage unit 405B. In addition, HNB-GW signal transceiver 401B is one example of transmission unit 42B shown in FIG. 22.

HNB-GW signal transceiver 401B, RANAP message processor 402B, NAS message processor 403B, and station data storage unit 405B each have the same functions as HNB-GW signal transceiver 401A, RANAP message processor 402A, NAS message processor 403A, and station data storage unit 405A, respectively, that are shown in FIG. 13.

Similar to call control unit 404A shown in FIG. 13, call control unit 404B has functions typically held by a call processor that is installed in MSC 40.

In addition to the previous description, call control unit 404B further has, as special functions of the present exemplary embodiment, functions of analyzing NAS messages to judge whether the call type of a call originated by mobile station 10 is an emergency call, and based on the judgment result, setting the Call Type parameter of RANAP protocol messages that are transmitted to HNB-GW 30.

In addition, referring to FIG. 26, SGSN 50 of the present exemplary embodiment includes HNB-GW signal transceiver 501B, RANAP message processor 502B, NAS message processor 503B, call control unit 504B, and station data storage unit 505B.

In FIG. 26, control unit 51B shown in FIG. 23 is made up by RANAP message processor 502B, NAS message processor 503B, call control unit 504B, and station data storage unit 505B. In addition, HNB-GW signal transceiver 501B is one example of transmission unit 52B shown in FIG. 23.

HNB-GW signal transceiver 501B, RANAP message processor 502B, NAS message processor 503B, and station data storage unit 505B each have the same functions as HNB-GW signal transceiver 501A, RANAP message processor 502A, NAS message processor 503A, and station data storage unit 505A, respectively, shown in FIG. 14.

Similar to call control unit 504A shown in FIG. 14, call control unit 504B has functions typically held by a call processor that is installed in SGSN 50.

In addition to the previous description, call control unit 504B has, as special functions of the present exemplary embodiment, functions for analyzing NAS messages to judge whether the call type of a call originated by mobile station 10 is an emergency call, and based on the result of judgment, setting the Call Type parameter of a RANAP protocol message that is transmitted to HNB-GW 30.

Referring to FIG. 27, HNB-GW 30 of the present exemplary embodiment includes: HNB signal transceiver 301B, RUA message processor 302B, SGSN signal transceiver 303B, MSC signal transceiver 304B, HNBAP message processor 305B, call control unit 306B, RANAP message processor 307B, and station data storage unit 308B.

In FIG. 27, control unit 32B shown in FIG. 24 is made up by RUA message processor 302B, HNBAP message processor 305B, call control unit 306B, RANAP message processor 307B, and station data storage unit 308B. In addition, SGSN signal transceiver 303B and MSC signal transceiver 304B are examples of reception unit 31B shown in FIG. 24.

Each of HNB signal transceiver 301B, RUA message processor 302B, SGSN signal transceiver 303B, MSC signal transceiver 304B, HNBAP message processor 305B, RANAP message processor 307B, and station data storage unit 308B has the same functions as HNB signal transceiver 301A, RUA message processor 302A, SGSN signal transceiver 303A, MSC signal transceiver 304A, HNBAP message processor 305A, RANAP message processor 307A, and station data storage unit 308A, respectively, shown in FIG. 12.

Call control unit 306B has functions that are typically held by a call processor installed in HNB-GW 30, similar to call control unit 306A shown in FIG. 12.

Apart from the above description, call control unit 306B further has, as special functions of the present exemplary embodiment, functions for judging that the call type of a call originated by mobile station 10 is a normal call when "Normal Call" is set in the Call Type parameter of a RANAP protocol message received from MSC 40 or SGSN 50, and if mobile station 10 has performed call origination as an emergency call at this time, for carrying out the call release process.

The configuration of HNB 20 of the present exemplary embodiment may be the same as FIG. 9. However, call control unit 205A of HNB 20 may have functions typically held by a call processor that is installed in HNB 20.

The operations of the mobile communication system of the present exemplary embodiment are next described.

(1) Working Example 1

The present Working Example is an example in which the result of judging the call type that was judged in MSC 40 or SGSN 50 is reported in a COMMON ID message of RANAP (3GPP TS25.413).

Figure 28:
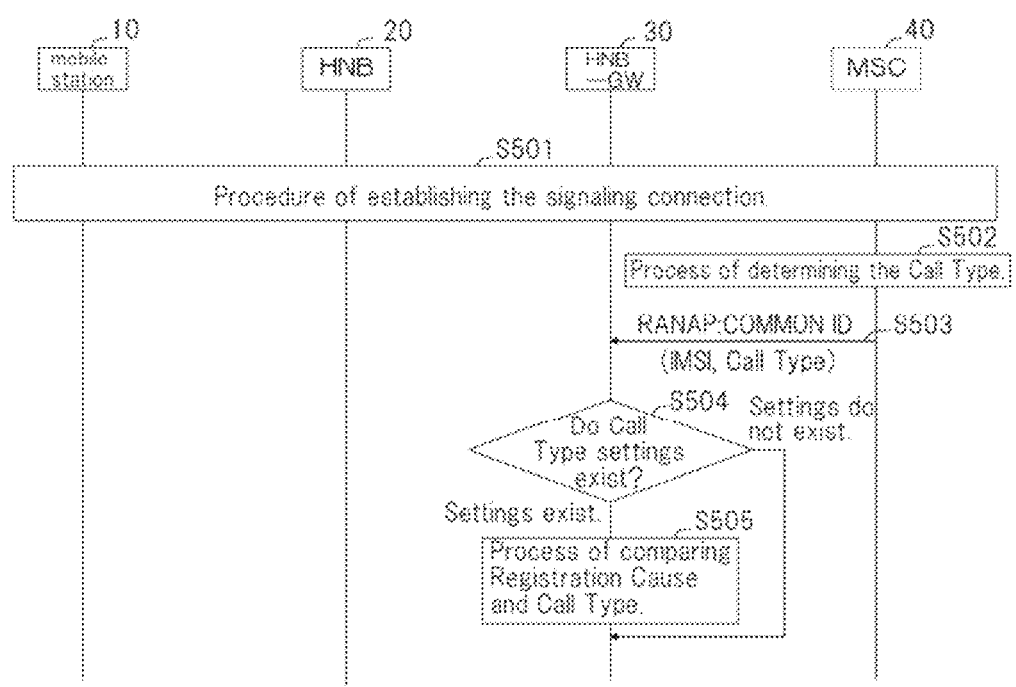
FIG. 28 is a sequence chart for describing Working Example 1 of the mobile communication system of the fourth exemplary embodiment of the present invention.

(1-A) The Case of a Circuit-Switched Call:

A Working Example for a case in which MSC 40 reports the judgment result of the call type of a circuit-switched call in a RANAP COMMON ID message is first described with the sequence chart of FIG. 28. FIG. 28 shows the operations that follow completion of the processes shown in FIG. 15, but it is assumed that the processes of Steps S112, S113, S116, and S117 shown in FIG. 15 are not carried out, and further, that an Emergency Cause parameter is not contained in the RANAP: INITIAL UE MESSAGE message that is transmitted in Steps S114 and S115.

Normally, as described in 3GPP TS25.413, after a signaling connection has been established, a core network apparatus transmits a RANAP: COMMON ID message to HNB-GW 30.

Referring to FIG. 28, in MSC 40, following the establishment of a signaling connection in Step S501, call control unit 404B initiates a process of determining the Call Type parameter in Step S502.

Figure 29:
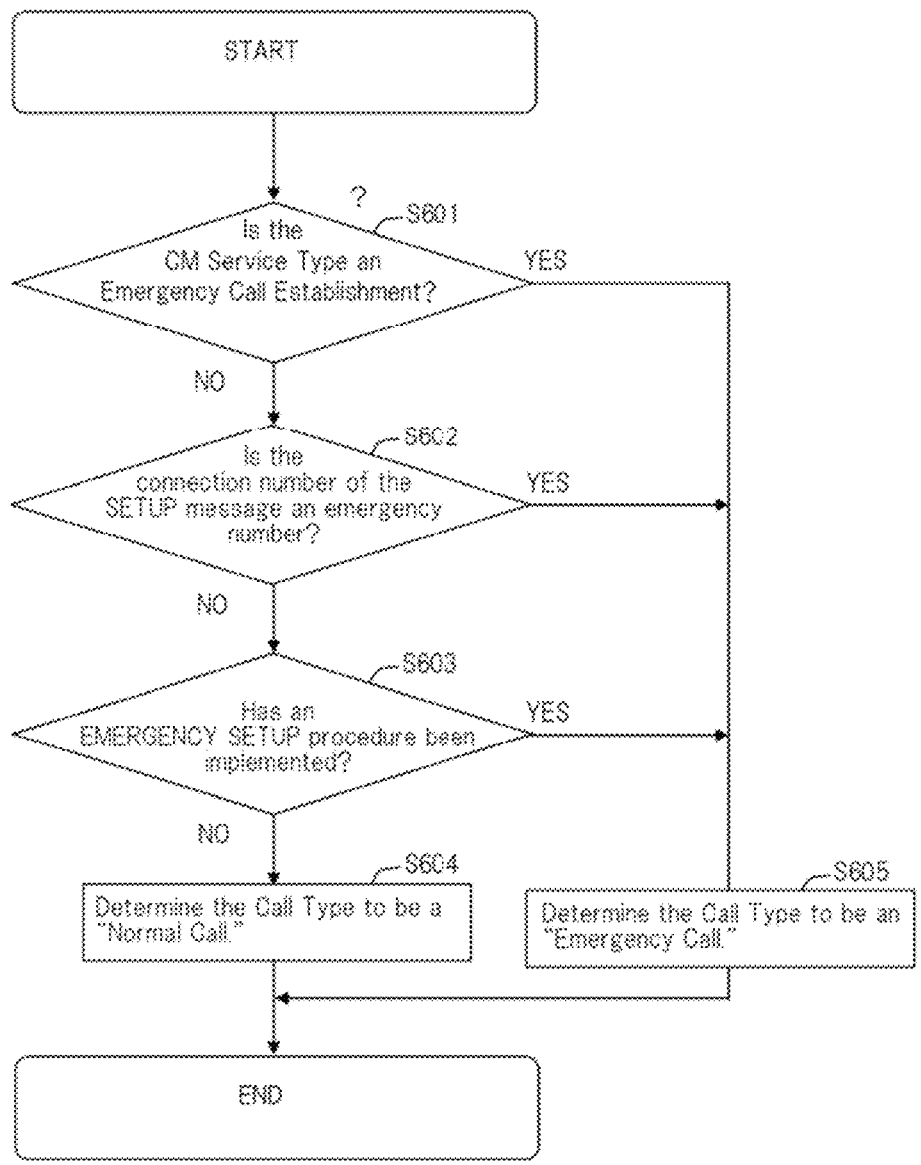
FIG. 29 is a flow chart for describing the process of determining the Call Type parameter by the MSC of the fourth exemplary embodiment of the present invention.

FIG. 29 is a flow chart of the process of determining the Call Type parameter in MSC 40.

Referring to FIG. 29, call control unit 404B checks whether the CM Service Type parameter (TS24.008 Ver 8.5.0 Section 10.5.3.3) that is set in the CM SERVICE REQUEST message (TS24.008 Ver 8.5.0 Section 9.2.9) of MM protocol that was transmitted from mobile station 10 in Step S601 is "Emergency Call Establishment."

In Step S602, call control unit 404B next checks whether the telephone number (TS24.008 Ver 8.5.0 Section 10.5.4.7) of the SETUP (TS24.008 9.3.23 Ver 8.5.0 Section Setup) message of CC protocol that is the origination signal transmitted by MSC 40 is an emergency number. More specifically, Number digit 1, Number digit 2, Number digit 3 in TS24.008 Ver 8.5.0 FIG. 10.5.91/3GPP TS 24.008 Called party BCD number information element correspond to a telephone number, and call control unit 404B checks whether this telephone number is an emergency number. The Called Party BCD Number of TS24.008 Section 10.5.4.7 refers to the connected number, and BCD is one method of expressing numbers in computers in which one place of a decimal expression is represented by a four-place binary number that represents from 0 to 9.

In Step S603, call control unit 404B next checks whether an EMERGENCY SETUP procedure (TS24.008 Ver 8.5.0 Section 9.3.8) has been carried out in mobile station 10. For example, upon receiving a message for starting "emergency call establishment" from mobile station 10, call control unit 404B checks whether an EMERGENCY SETUP procedure is being carried out from information element "Emergency setup message type."

If any of the checks of Steps S601-S603 is satisfied, call control unit 404B determines that the call type is an emergency call and determines the Call Type parameter as "Normal Call" in Step S604. On the other hand, if any of the checks is not satisfied, call control unit 404B determines that the call type is a normal call and determines the Call Type parameter as "Emergency Call" in Step S605.

Again referring to FIG. 28, in MSC 40, if the Call Type parameter has been determined when call control unit 404B transmits a RANAP: COMMON ID message to HNB-GW 30 in Step S503, this Call Type parameter is set. The configuration of the RANAP: COMMON ID message according to the present invention is shown in FIG. 30.

In HNB-GW 30, when a Call Type parameter is included at the time of receiving the RANAP: COMMON ID message in Step S504, call control unit 306B in Step S505 compares the Call Type parameter with the Registration Cause parameter (FIG. 6) of the HNBAP: UE REGISTER REQUEST message (FIG. 5) when mobile station 10 accesses HNB-GW 30.

FIG. 31 shows a table for determining processing according to call type in HNB-GW 30 of the present exemplary embodiment.

For example, in Case 2 shown in FIG. 31, the Call Type parameter reported from MSC 40 is "Normal Call" even though the Registration Cause parameter of the HNBAP: UE REGISTER REQUEST message is "Emergency Call." For this reason, HNB-GW 30 determines that mobile station 10 has falsely represented an emergency call and is illegitimately accessing HNB 20, whereby HNB-GW 30 carries out the call release process.

In this way, unauthorized mobile station 10-2 that is not supposed to be able to access HNB 20 and that has altered the Establishment Cause to misrepresent an emergency call can be prevented from receiving service by HNB 20.

(1-B) The Case of a Packet-Switched Call:

An example of the operations is next described for a case in which SGSN 50 reports the result of judging the call type of a packet-switched call in an RANAP COMMON ID message.

The operation sequence for the case of a packet-switched call is similar to the case of a circuit-switched call with the exception that the processes that were carried out in MSC 40 are now carried out in SGSN 50. However, the process of determining the Call Type parameter that is activated in Step S502 is different.

Figure 32:
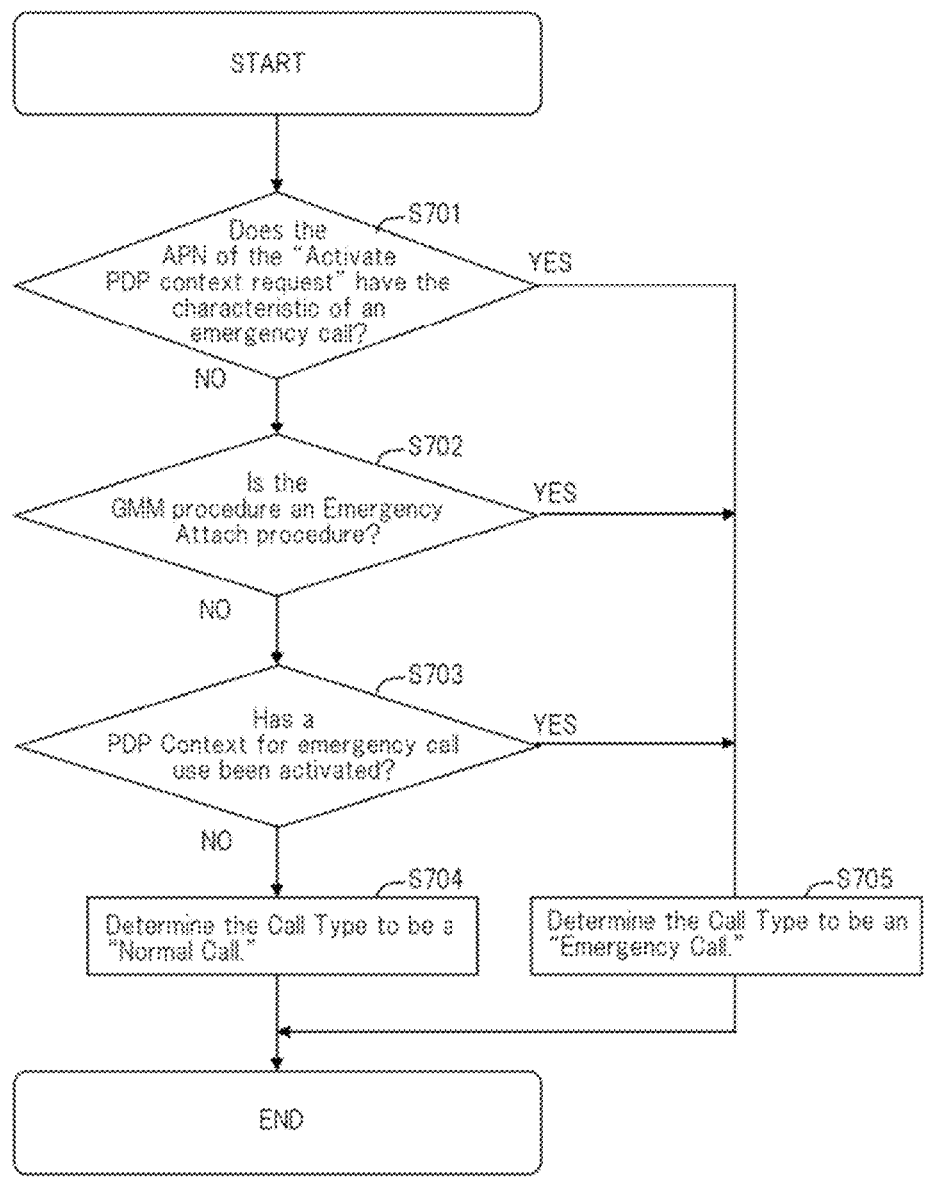
FIG. 32 is a flow chart showing the process of determining the Call Type parameter by the SGSN of the fourth exemplary embodiment of the present invention.

FIG. 32 is a flow chart of the process of determining the Call Type parameter in SGSN 50.

Referring to FIG. 32, in Step S701, call control unit 504B checks whether the APN (3GPP TS24.008 9.5.1 Section 10.5.6.1) that is set in the Activate PDP context request message (3GPP TS24.008 Ver 8.5.0 Section 9.5.1) of SM protocol that was transmitted from mobile station 10 is characteristic of an emergency call.

Next, in Step S702, call control unit 504B checks whether the GMM procedure that is carried out in mobile station 10 is an Emergency Attach procedure (TR23.869 Ver 9.0.0).

In Step S703, call control unit 504B next checks whether the PDP Context that was activated in SGSN 50 is a PDP Context for emergency call use. For example, call control unit 504B checks whether the PDP Context that is activated in SGSN 50 is the Emergency PDP Context of TR23.869 Ver 9.0.0.

If any of the checks of Steps S701-S703 is satisfied, call control unit 504B determines that the call type is an emergency call and determines the Call Type parameter as "Normal Call" in Step S704. On the other hand, if none of the checks is satisfied, call control unit 504B determines that the call type is a normal call and determines the Call Type parameter as "Emergency Call" in Step S705.

In SGSN 50, if the Call Type parameter is determined when the RANAP: COMMON ID message is transmitted to HNB-GW 30, call control unit 504B sets this Call Type parameter. The structure of the RANAP: COMMON ID message according to the present invention is the same as the case for MSC 40 as shown in FIG. 30.

In HNB-GW 30, if the Call Type parameter is included at the time of receiving the RANAP: COMMON ID message call, call control unit 306B compares this Call Type parameter with the Registration Cause parameter (FIG. 6) of HNBAP: UE REGISTER REQUEST message (FIG. 5) at the time mobile station 10 accesses HNB-GW 30.

For example, in Case 2 shown in FIG. 31, the Call Type parameter reported from SGSN 50 is "Normal Call" even though the Registration Cause parameter of the HNBAP: UE REGISTER REQUEST message is "Emergency Call." Based on these circumstances, HNB-GW 30 judges that mobile station 10 has falsely represented an emergency call and is illegitimately accessing HNB 20 and therefore implements the call release process.

Thus, in the case of a packet-switched VoIP, unauthorized mobile station 10-2 that is not supposed to be able to access HNB 20 and that has altered the Establishment Cause to falsely represent an emergency call can be prevented from receiving service by HNB 20.

(2) Working Example 2

This Working Example is an example in which the result of judging the call type that was judged in MSC 40 or SGSN 50 is reported in a RANAP (3GPP TS25.413) DIRECT TRANSFER message.

Figure 33:
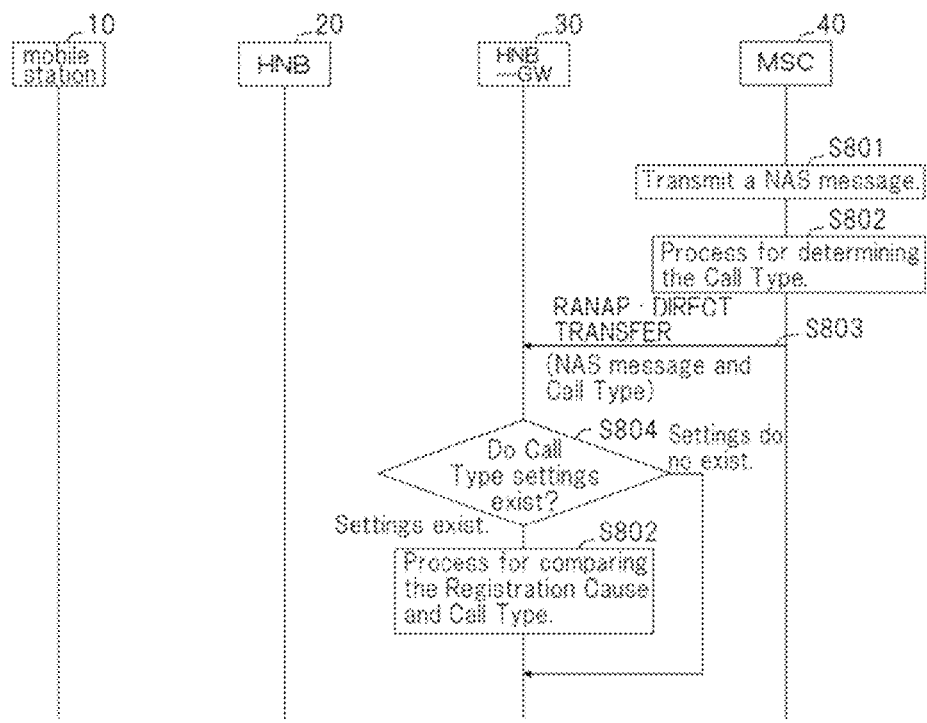
FIG. 33 is a sequence chart for describing Working Example 2 the mobile communication system of the fourth exemplary embodiment of the present invention.

(2-A) The Case of a Circuit-Switched Call:

A Working Example for a case in which MSC 40 reports the result of judging the call type of a circuit-switched call in a RANAP DIRECT TRANSFER message is first described with the sequence chart of FIG. 33. FIG. 33 shows operations that follow completion of the processing shown in FIG. 15, but it is here assumed that the processes of Steps S112, S113, S116, and S117 shown in FIG. 15 are not carried out, and further, that the Emergency Cause parameter is not included in the RANAP: INITIAL UE MESSAGE message that is transmitted in Steps S114 and S115.

Normally, as described in 3GPP TS25.413, when transmitting an NAS message such as CC protocol or MM protocol, the core network apparatus transmits a RANAP: DIRECT TRANSFER message to HNB-GW 30.

Referring to FIG. 33, in MSC 40, after transmitting the NAS message in Step S801, call control unit 404B initiates the process of determining the Call Type parameter in Step S802. The process of determining the Call Type parameter in MSC 40 is the same as in Working Example 1 and is as shown in FIG. 29.

In MSC 40, if the Call Type parameter is determined when the RANAP: DIRECT TRANSFER message is transmitted to HNB-GW 30 in Step S803, call control unit 404B sets this Call Type parameter. The configuration of the RANAP: DIRECT TRANSFER message according to the present invention is shown in FIG. 34.

In HNB-GW 30, if the Call Type parameter is included at the time of reception of the RANAP: DIRECT TRANSFER message in Step S804, call control unit 306B in Step 805 compares this Call Type parameter with the Registration Cause parameter (FIG. 6) of the HNBAP: UE REGISTER REQUEST message (FIG. 5) when mobile station 10 accesses HNB-GW 30.

For example, in Case 2 shown in FIG. 31, the Call Type parameter that was reported from MSC 40 is "Normal Call" even though the Registration Cause parameter of the HNBAP: UE REGISTER REQUEST message is "Emergency Call." Based on these circumstances, HNB-GW 30 determines that mobile station 10 has misrepresented an emergency call and is illegitimately accessing HNB 20 and therefore implements the call release process.

As a result, unauthorized mobile station 10-2 that is not supposed to be able to access HNB 20 and that has altered the Establishment Cause to misrepresent an emergency call can be prevented from receiving service by HNB 20.

(1-B) The Case of a Packet-Switched Call:

An example of operations is next described for a case in which SGSN 50 reports the result of judging the call type of a packet-switched call by a RANAP DIRECT TRANSFER message.

The operation sequence in the case of a packet-switched call is similar to the processes that were carried out in MSC 40 in the case of a circuit-switched call with the exception that the processes are carried out in SGSN 50. However, the process of determining the Call Type parameter that is activated in Step S802 is different. The process of determining the Call Type parameter in SGSN 50 is similar to Working Example 1 and is as shown in FIG. 32.

In SGSN 50, if the Call Type parameter is determined when a RANAP: DIRECT TRANSFER message is transmitted to HNB-GW 30, call control unit 504B sets this Call Type parameter. The configuration of the RANAP: DIRECT TRANSFER message according to the present invention is the same as the case for MSC 40 as shown in FIG. 34.

In HNB-GW 30, when the Call Type parameter is included at the time of receiving the RANAP: DIRECT TRANSFER message, call control unit 306B compares this Call Type parameter and the Registration Cause parameter (FIG. 6) of the HNBAP: UE REGISTER REQUEST message (FIG. 5) when mobile station 10 accesses HNB-GW 30.

For example, in Case 2 shown in FIG. 31, the Call Type parameter that is reported from SGSN 50 is "Normal Call" even though the Registration Cause parameter of the HNBAP: UE REGISTER REQUEST message is "Emergency Call." Based on these circumstances, HNB-GW 30 determines that mobile station 10 has misrepresented an emergency call and is illegitimately accessing HNB 20, and therefore implements the call release process. In this way, unauthorized mobile station 10-2 that is not supposed to be able to access HNB 20 and that has altered the Establishment Cause to misrepresent an emergency call can be prevented from receiving service by HNB 20 even for the case of a packet-switched VoIP.

(3) Working Example 3

This Working Example is a case in which the judgment result of call type that is judged in MSC 40 or SGSN 50 is reported in a RAB (Radio Access Bearer) ASSIGNMENT REQUEST message of RANAP (3GPP TS25.413).

Figure 35:
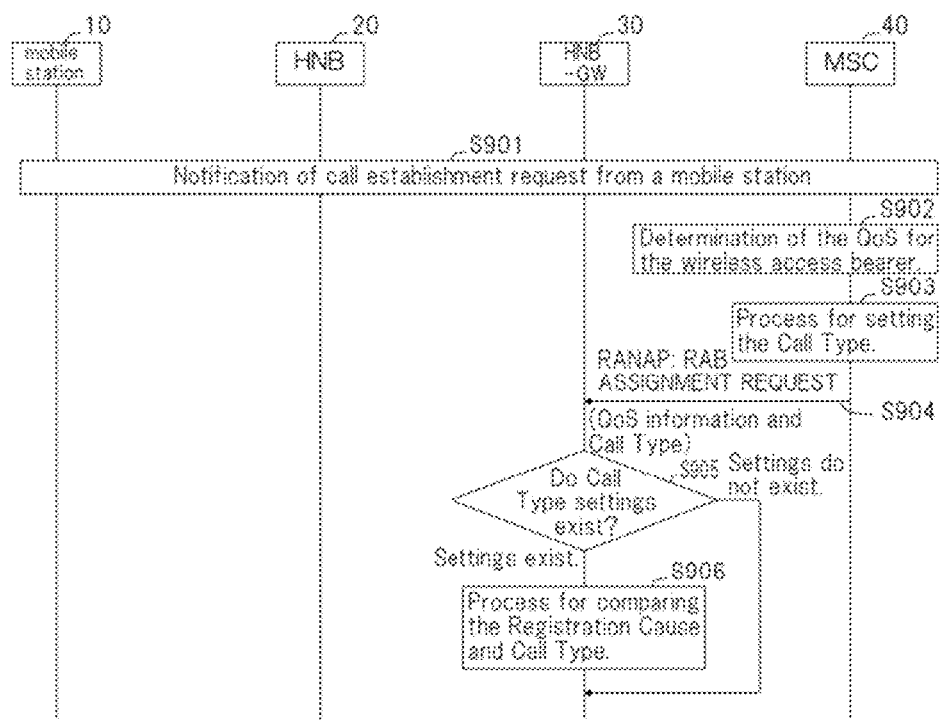
FIG. 35 is a sequence chart for describing Working Example 3 of the mobile communication system of the fourth exemplary embodiment of the present invention.

(3-A) The Case of a Circuit-Switched Call:

A Working Example for a case in which MSC 40 reports the result of judging the call type of a circuit-switched call in a RANAP RAB ASSIGNMENT REQUEST message is described along with the sequence chart of FIG. 35. FIG. 35 shows operations that follow the completion of the processes shown in FIG. 15, and it is here assumed that the processes of Steps S112, S113, S116, and S117 are not carried out, and further, that the Emergency Cause parameter is not included in the RANAP: INITIAL UE MESSAGE message that is transmitted in Steps S114 and S115.

Normally, as described in 3GPP TS25.413, when a core network apparatus receives a call establishment request from mobile station 10 and establishes a wireless access bearer, the core network apparatus transmits a RANAP: RAB ASSIGNMENT REQUEST message to HNB-GW 30.

Referring to FIG. 35, in MSC 40, after receiving a call establishment request from mobile station 10 in Step S901, call control unit 404B determines the QoS (Quality of Service) for the wireless access bearer and then activates the process of determining the Call Type parameter in Step S903. The process of determining the Call Type parameter in MSC 40 is the same as in Working Example 1 and is as shown in FIG. 29.

In MSC 40, if the Call Type parameter is determined when the RANAP: RAB ASSIGNMENT REQUEST message is transmitted to HNB-GW 30 in Step S904, call control unit 404B sets this Call Type parameter. The configuration of the RANAP: RAB ASSIGNMENT REQUEST message according to the present invention is shown in FIG. 36.

In HNB-GW 30, if the Call Type parameter is included in Step S905 at the time of receiving the RANAP: RAB ASSIGNMENT REQUEST message, call control unit 306B in Step S906 compares this Call Type parameter with the Registration Cause parameter (FIG. 6) of the HNBAP: UE REGISTER REQUEST message (FIG. 5) when mobile station 10 accessed HNB-GW 30.

For example, in Case 2 shown in FIG. 31, the Call Type parameter reported from MSC 40 is "Normal Call" even though the Registration Cause parameter of the HNBAP: UE REGISTER REQUEST message is "Emergency Call." Based on these circumstances, HNB-GW 30 determines that mobile station 10 has falsely represented an emergency call and is illegitimately accessing HNB 20 and therefore implements the call release process.

In this way, unauthorized mobile station 10-2 that is not supposed to be able to access HNB 20 and that has altered the Establishment Cause to falsely represent an emergency call can be prevented from receiving service by HNB 20.

(1-B) The Case of a Packet-Switched Call:

An example of operation is next described for a case in which SGSN 50 reports the judgment result of the call type of a packet-switched call in a RANAP RAB ASSIGNMENT REQUEST message.

The operation sequence in the case of a packet-switched call is similar to a circuit-switched call with the exception that the processes carried out in MSC 40 are carried out in SGSN 50. However, the process of determining the Call Type parameter that is activated in Step S802 is different. This process of determining the Call Type parameter in SGSN 50 is the same as in Working Example 1 and is as shown in FIG. 32.

In SGSN 50, if the Call Type parameter is determined when the RANAP: RAB ASSIGNMENT REQUEST message is transmitted to HNB-GW 30, call control unit 504B sets this Call Type parameter. The configuration of the RANAP: RAB ASSIGNMENT REQUEST message according to the present invention is the same as the case of MSC 40 as shown in FIG. 36.

In HNB-GW 30, if the Call Type parameter is included at the time of receiving the RANAP: RAB ASSIGNMENT REQUEST message, call control unit 306B compares this Call Type parameter and the Registration Cause parameter (FIG. 6) of the HNBAP: UE REGISTER REQUEST message (FIG. 5) at the time that mobile station 10 accessed HNB-GW 30.

In Case 2 shown in FIG. 31, the Call Type parameter that was reported from SGSN 50 is "Normal Call" even though the Registration Cause parameter of the HNBAP: UE REGISTER REQUEST message is "Emergency Call." Based on these circumstances, HNB-GW 30 determines that mobile station 10 has falsely represented an emergency call and is illegitimately accessing HNB 20 and therefore implements the call release process.

In this way, unauthorized mobile station 10-2 that is not supposed to be able to access HNB 20 and that has altered the Establishment Cause to falsely represent an emergency call can be prevented from receiving service by HNB 20 even in the case of a packet-switched VoIP.

The methods carried out in HNB 20, HNB-GW 30, MSC 40, and SGSN 50 of the present invention may be applied to a program that is to be executed by a computer. In addition, this program can be stored on a recording medium and can be offered to the outside by way of a network.

Although the present invention has been described hereinabove in specific terms based on preferred exemplary embodiments, the present invention is not limited to the above-described exemplary embodiments and is obviously open to various modifications that do not depart from the gist of the invention.

For example, in the second exemplary embodiment, setting of the Emergency Cause value to the RANAP protocol message was carried out by HNB 20, but this setting may also be carried out by HNB-GW 30.

In addition, in the second exemplary embodiment, unauthorized access countermeasures are carried out in MSC 40 or SGSN 50, but these countermeasures may also be carried out in HNB-GW 30. In this case, as in the fourth exemplary embodiment, HNB-GW 30 receives information from MSC 40 or SGSN 50 indicating that the actual call type of the call that was originated by mobile station 10 is an emergency call and uses the table of FIG. 31 to implement the unauthorized access countermeasures.

In addition, according to the first to fourth exemplary embodiments, RANAP protocol messages are used to communicate information indicating that mobile station 10 has originated a call as an emergency call or information indicating that the actual call type of a call originated by mobile station 10 is an emerstency call between HNB 20, HNB-GW 30, and core network apparatus (MSC 40 or SGSN 50). However, the messages are not limited to RANAP protocol messages, and other messages may be used if the messages can be communicated among HNB 20, HNB-GW 30, and a core network apparatus.

This application claims the benefits of priority based on Japanese Patent Application No. 2009-101130 for which application was submitted on Apr. 17, 2009 and incorporates by citation all of the disclosures of that application.

The invention claimed is:

1. A gateway apparatus that connects a base station to a core network apparatus that is arranged in a core network, said gateway apparatus comprising:
a communication unit that communicates with said core network apparatus; and
a reception unit that receives a RAB ASSIGNMENT REQUEST message that is transmitted from said core network and that includes information indicating that a call type of a call originated by a mobile station is an emergency call,
wherein said RAB ASSIGNMENT REQUEST message includes a parameter; and
wherein information indicating that said call type of said call originated by said mobile station is said emergency call in said parameter.

2. The gateway apparatus of claim 1, further comprising:
a control unit that, when information indicating that said call type of a call originated by said mobile station is a Normal Call is included in said message, implements a call release process if said call type reported from that mobile station is an emergency call.

3. The gateway apparatus of claim 1, wherein said RAB ASSIGNMENT REQUEST message is a message to request establishing a wireless access bearer.

4. The gateway apparatus of claim 1, wherein said RAB ASSIGNMENT REQUEST message is a RANAP message.

5. A core network apparatus that is arranged in a core network, comprising:
a communication unit that communicates with a gateway apparatus; and
a transmission unit that transmits a RAB ASSIGNMENT REQUEST message to said gateway apparatus,
wherein said RAB ASSIGNMENT REQUEST message includes a parameter; and
wherein information indicating that said call type of said call originated by said mobile station is said emergency call in said parameter.

6. The core network apparatus of claim 5, wherein said message is a COMMON ID message of RANAP protocol,
and wherein said control unit of said core network apparatus adds a Call Type parameter to said COMMON ID message and includes information indicating that said call type of a call originated by said mobile station is an emergency call in said Call Type parameter.

7. The core network apparatus of claim 5, wherein said message is a DIRECT TRANSFER message of RANAP protocol,
and wherein said control unit of said core network apparatus adds a Call Type parameter to said DIRECT TRANSFER message and includes information indicating that said call type of a call originated by said mobile station is an emergency call in said Call Type parameter.

8. The core network apparatus of claim 5, wherein said RAB ASSIGNMENT REQUEST message is a message to request establishing a wireless access bearer.

9. The core network apparatus of claim 5, wherein said RAB ASSIGNMENT REQUEST message is a RANAP message.

10. A communication method that is realized by a gateway apparatus that connects a base station to a core network apparatus that is arranged in a core network, said communication method comprising a step of:
receiving a RAB ASSIGNMENT REQUEST message that is transmitted from said core network apparatus and that includes information indicating that said call type of a call originated by a mobile station is an emergency call,
wherein said RAB ASSIGNMENT REQUEST message includes a parameter; and
wherein information indicating that said call type of said call originated by said mobile station is said emergency call in said parameter.

11. The method of claim 10, further comprising:
when information indicating that said call type of a call originated by said mobile station is a Normal Call is included in said message, implementing a call release process if said call type reported from that mobile station is an emergency call.

12. The communication method of claim 10, wherein said RAB ASSIGNMENT REQUEST message is a message to request establishing a wireless access bearer.

13. The communication method of claim 10, wherein said RAB ASSIGNMENT REQUEST message is a RANAP message.

14. A communication method that is realized by a core network apparatus that is arranged in a core network, said communication method comprising steps of:
including, in a RAB ASSIGNMENT REQUEST message, information indicating that said call type of a call originated by a mobile station is an emergency call; and
transmitting said message to a gateway apparatus,
wherein said RAB ASSIGNMENT REQUEST message includes a parameter; and
wherein information indicating that said call type of said call originated by said mobile station is said emergency call in said parameter.

15. The method of claim 14, wherein said message is a COMMON ID message of RANAP protocol,
and wherein said method further comprises adding a Call Type parameter to said COMMON ID message and includes information indicating that said call type of a call originated by said mobile station is an emergency call in said Call Type parameter.

16. The method of claim 14, wherein said message is a DIRECT TRANSFER message of RANAP protocol, and wherein said method further comprises adding a Call Type parameter to said DIRECT TRANSFER message and includes information indicating that said call type of a call originated by said mobile station is an emergency call in said Call Type parameter.

17. The method of claim 14, wherein said message is a RAB ASSIGNMENT REQUEST message of RANAP protocol, and wherein said method further comprises adding a Call Type parameter to said RAB ASSIGNMENT REQUEST message and includes information indicating that said call type of a call originated by said mobile station is an emergency call in said Call Type parameter.

18. The communication method of claim 14, wherein said RAB ASSIGNMENT REQUEST message is a message to request establishing a wireless access bearer.

19. The communication method of claim 14, wherein said RAB ASSIGNMENT REQUEST message is a RANAP message.

20. A mobile station in a mobile communication system that includes said mobile station, a base station that performs wireless communication with said mobile station, a gateway apparatus that connects said base station to a core network, and a core network apparatus that is arranged in said core network, said mobile station comprising;

a communication unit which communicates with said base station that transmits a registration message for registering said mobile station in said gateway apparatus;

wherein said gateway apparatus receives, from said core network, a RAB ASSIGNMENT REQUEST message which includes information indicating that a call type of a call originated by said mobile station is an emergency call, wherein information indicating that said call type of said call originated by said mobile station is said emergency call in said parameter.

21. The mobile station of claim 20, wherein said RAB ASSIGNMENT REQUEST message is a message to request establishing a wireless access bearer.

22. The mobile station of claim 20, wherein said RAB ASSIGNMENT REQUEST message is a RANAP message.

* * * * *